(12) United States Patent
Mori et al.

(10) Patent No.: US 8,290,274 B2
(45) Date of Patent: Oct. 16, 2012

(54) METHOD FOR HANDWRITTEN CHARACTER RECOGNITION, SYSTEM FOR HANDWRITTEN CHARACTER RECOGNITION, PROGRAM FOR HANDWRITTEN CHARACTER RECOGNITION AND STORING MEDIUM

(75) Inventors: Shunji Mori, Hachiouji (JP); Tomohisa Matsushita, Hachiouji (JP)

(73) Assignee: Kite Image Technologies Inc., Tokyo (JP)

( * ) Notice: Subject to any disclaimer, the term of this patent is extended or adjusted under 35 U.S.C. 154(b) by 988 days.

(21) Appl. No.: 11/816,266

(22) PCT Filed: Feb. 15, 2006

(86) PCT No.: PCT/JP2006/303104
§ 371 (c)(1),
(2), (4) Date: Dec. 1, 2008

(87) PCT Pub. No.: WO2006/088222
PCT Pub. Date: Aug. 24, 2006

(65) Prior Publication Data
US 2009/0136136 A1    May 28, 2009

(30) Foreign Application Priority Data
Feb. 15, 2005   (JP) ................. 2005-038224

(51) Int. Cl.
*G06K 9/48* (2006.01)
(52) U.S. Cl. ......... 382/186; 382/187; 382/198; 382/241
(58) Field of Classification Search .......... 382/187, 382/241, 242, 197, 198, 186
See application file for complete search history.

(56) References Cited

U.S. PATENT DOCUMENTS
| 4,718,103 A * | 1/1988 | Shojima et al. ............ 382/189 |
| 6,208,756 B1 * | 3/2001 | Suzuki ........................ 382/187 |
| 2005/0041870 A1 * | 2/2005 | Reichenbach et al. ..... 382/198 |

FOREIGN PATENT DOCUMENTS
| JP | 55-138172 | 10/1980 |
| JP | 60-221887 | 11/1985 |
| JP | 2000-163514 | 6/2000 |

* cited by examiner

Primary Examiner — Jon Chang
(74) Attorney, Agent, or Firm — Ditthavong Mori & Steiner, P.C.

(57) ABSTRACT

A method is provided that includes capturing an input handwritten character with parameter representation for each stroke and applying a polygonal approximation thereto; assuming each polygonal line segment approximated to be vector that reaches an end point from a start point, and obtaining an angle between an axis that becomes a reference and each line segment as a polygonal line segment angle sequence; obtaining an exterior angle sequence of vertices of the line segments; making a sum of exterior angles of the same sign, where the same sign of plus or minus in the exterior angle sequence continues, to be a winding angle sequence; extracting a global feature according to each obtained sequence and a localized or quasi-localized feature in each curved portion divided corresponding to the winding angle sequence, hierarchically and divisionally; and performing character recognition by comparing the extracted result with a template of an object character.

12 Claims, 27 Drawing Sheets

FIG. 6

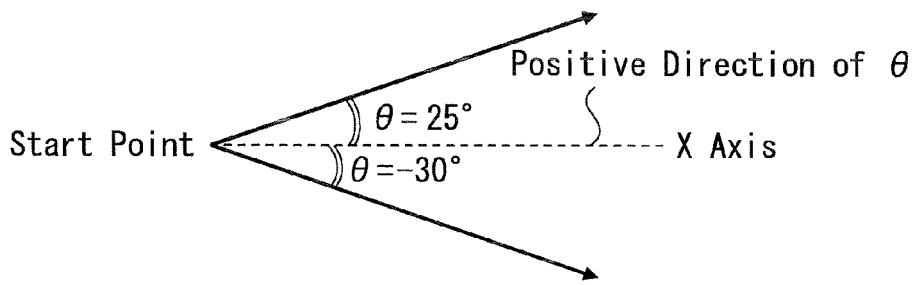

FIG. 7

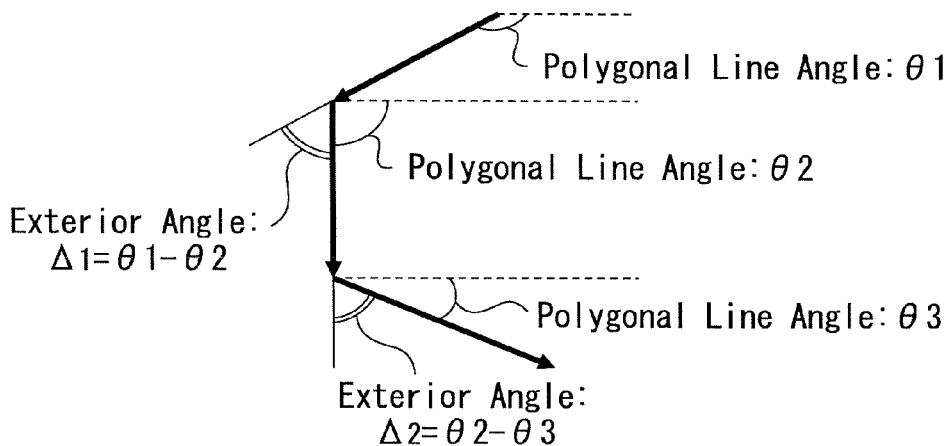

Polygonal Line Angle Sequence: $(\theta1, \theta2, \theta3, \ldots \theta n)$
Exterior Angle Sequence: $((\theta1-\theta2), (\theta2-\theta3), \ldots (\theta n-\theta n+1))$
: $(\Delta1, (\Delta2, \ldots \Delta n)$ If Absolute Value of Difference Between Adjacent $\theta$s Exceeds 180°

① Positive Difference: $\Delta n = [\theta n - \theta n+1] - 360°$
② Negative Difference: $\Delta n = 360° - |\theta n - \theta n+1|$ Division in Same Winding Angle (Pre-Winding Angle)

Division in Same Winding Angle (Post Winding Angle)

| Polygonal Line Number | V0 | V1 | V2 | V3 | V4 | V5 | Total |
|---|---|---|---|---|---|---|---|
| Normalized Length | 0.12 | 0.13 | 0.13 | 0.10 | 0.30 | 0.22 | 1.0 |

Normalized Length = Length of Each Polygonal Line/ Whole Length of One Stroke

Length Sequence: 0.12, 0.13, 0.13, 0.10, 0.30, 0.22

FIG. 12A   FIG. 12B   FIG. 12C
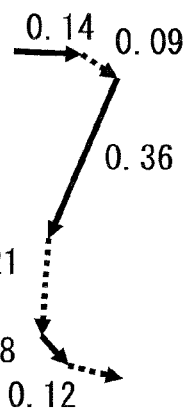
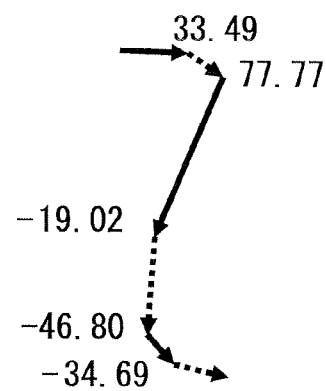
Original Figure   Length Sequence   Δ Sequence
FIG. 13A   FIG. 13B   FIG. 13C
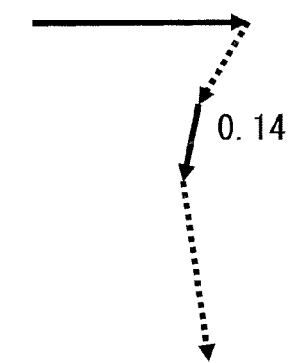
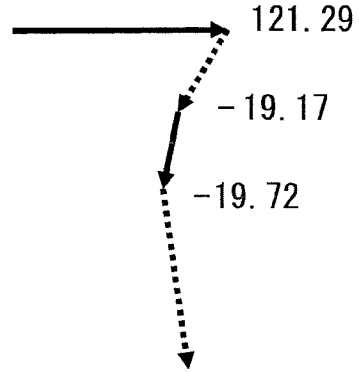
Original Figure   Length Sequence   Δ Sequence (Original Figure)

(Length Sequence)

(Δ Sequence)

FIG. 17

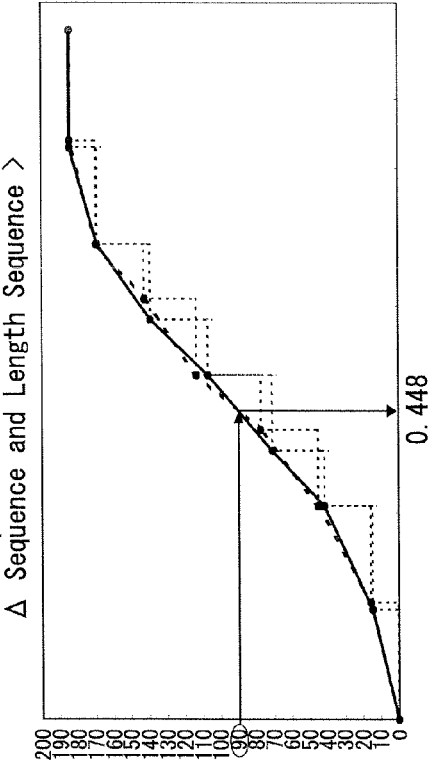

Cumulative Angle Characteristic Function (1)

< Linear Interpolation Function by Exterior Angle/Δ Sequence and Length Sequence >

Obtain Length For Predetermined Cumulative Angle/Winding Angle

Length of 90° From Start Portion (a)
(90° Length of Start Portion): 0.448

Length of 90° From End Portion (b)
(90° Length of End Portion): 0.448

Min {(a), (b)}Max{(a), (b)}
(90 Degree Length Ratio): 1.0

(From Start Portion: Forward Direction)

| Length Sequence | 0.16 | 0.15 | 0.08 | 0.11 | 0.08 | 0.11 | 0.08 | 0.11 | 0.14 | 0.17 |
|---|---|---|---|---|---|---|---|---|---|---|
| Cumulative Length Sequence | 0.16 | 0.31 | 0.39 | 0.50 | 0.58 | 0.69 | 0.83 | 1.00 |
| Exterior Angle/Δ Sequence | 14.73 | 26.94 | 29.20 | 36.03 | 32.15 | 29.71 | 15.51 |
| Cumulative Angle/Winding Angle | 14.73 | 41.67 | 70.87 | 106.90 | 139.05 | 168.76 | 184.27 |

(From End Portion: Backward Direction)

| Length Sequence | 0.17 | 0.14 | 0.11 | 0.08 | 0.11 | 0.08 | 0.11 | 0.15 | 0.16 |
|---|---|---|---|---|---|---|---|---|---|
| Cumulative Length Sequence | 0.17 | 0.31 | 0.42 | 0.50 | 0.61 | 0.69 | 0.84 | 1.00 |
| Exterior Angle/Δ Sequence | 15.51 | 29.71 | 32.15 | 36.03 | 29.20 | 26.94 | 14.73 |
| Cumulative Angle/Winding Angle | 15.51 | 45.22 | 77.37 | 113.40 | 142.60 | 169.54 | 184.27 |

FIG. 18

Cumulative Angle Characteristic Function (2)

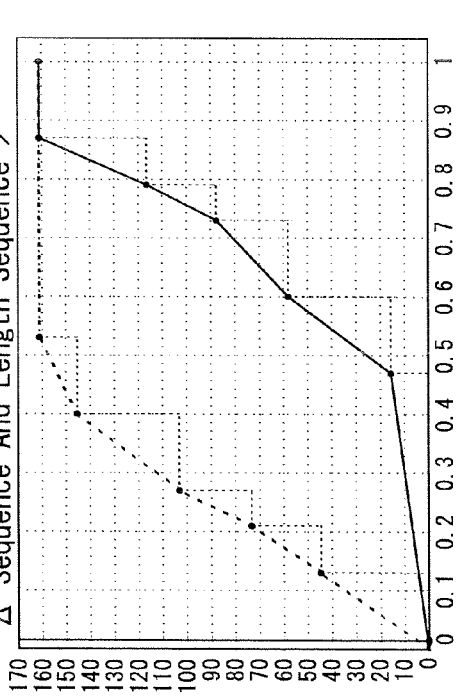

Cumulative Angle/Winding Angle for Predetermined Length
< Linear Interpolation Function by Exterior Angle/Δ Sequence And Length Sequence >

(From Start Portion: Forward Direction)

| Length Sequence | 0.47 | 0.13 | 0.13 | 0.06 | 0.08 | 0.13 |
|---|---|---|---|---|---|---|
| Cumulative Length Sequence | 0.47 | 0.60 | 0.73 | 0.79 | 0.87 | 1.00 |
| Exterior Angle/Δ Sequence | 15.67 | 42.29 | 29.74 | 28.72 | 44.67 | |
| Exterior Angle/Winding Angle | 15.67 | 57.96 | 87.70 | 116.42 | 161.09 | |

(From End Portion: Backward Direction)

| Length Sequence | 0.13 | 0.08 | 0.06 | 0.13 | 0.13 | 0.47 |
|---|---|---|---|---|---|---|
| Cumulative Length Sequence | 0.13 | 0.21 | 0.27 | 0.40 | 0.53 | 1.00 |
| Exterior Angle/Δ Sequence | 44.67 | 28.72 | 29.74 | 42.29 | 15.67 | |
| Exterior Angle/Winding Angle | 44.67 | 73.39 | 103.13 | 145.42 | 161.09 | |

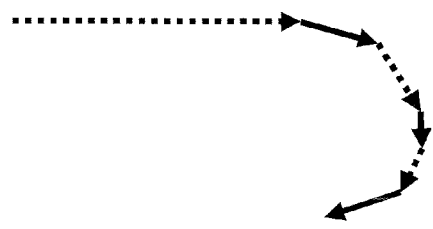

Obtaining Cumulative Angle/
Winding Angle for Predetermined Length

From Start Portion 0.3:10.00°     (A)
From End Portion 0.3:112.88°     (B)
(a)/(b)=0.09

(Notation)
λ Length Degree Ratio (0.3) =
0.09 (10.00, 112.88)

*FIG. 19A*      *FIG. 19B*
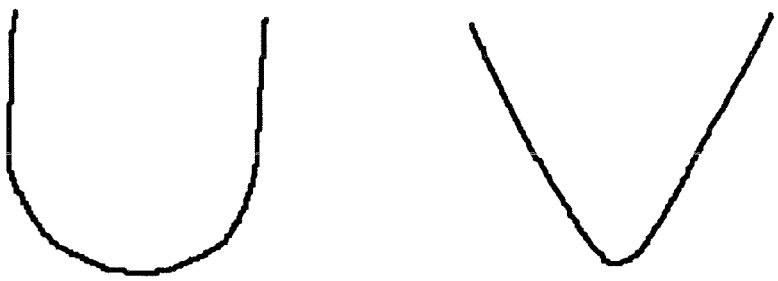
Original Figure
*FIG. 19C*      *FIG. 19D*
Length Sequence
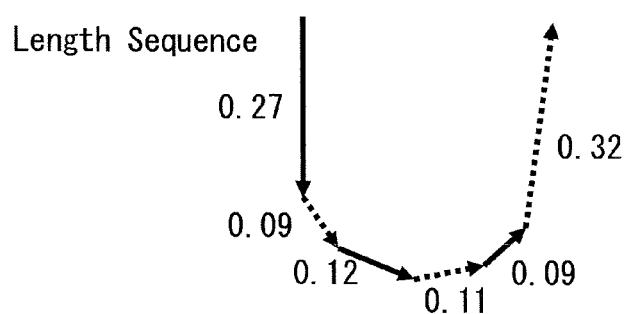 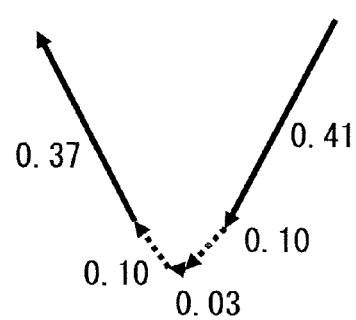

FIG. 21

<Classification Table in Case of One Winding Sequence>

| Layer | Range of Winding Angle | Figure |
|---|---|---|
| 0 | \|Θ\| < 20 | Straight Line |
| 1 | 20≤\|Θ\| > 50 | 1-Weak V"  1-Weak V'  1-Weak L"  1-Weak L'  1-Weak Arc 1"  1-Weak Arc 1  1-Weak Arc 2' |
| 2 | 50≤\|Θ\| < 90 | 2-Weak] 1  2-Weak V1"  2-Weak V1'  2-Weak V1  2-Weak L1"  2-Weak L1'  2-Weak L1  2-Weak Arc 1'  2-Weak Arc 1  2-Weak Arc 2'  2-Weak Arc 2  2-Weak Arc 3  etc. |
| 3 | 90≤\|Θ\| < 150 | 3-] 1'  3-Strong] 1  3-LJ 1  3-LJ 2  3-LJ 3  3-LJ 4  3-] 1'  3-Strong] 1'  3-Strong V1  3-Strong V2'  3-Strong V2  3-Strong V1"  3-Strong V1'  3-Strong V1  3-Strong J1'  3-Strong L1"  3-Strong L1'  3-Strong L2'  3-Strong L3'  3-Wide 1'  3-Wea J1'  3-Weak Arc 1  3-Weak Arc 2  3-Weak Arc 3  3-Obtuse J1  3-Obtuse Strong]1  3-Obtuse Strong]2  3-Weak Arc 4  3-Obtuse Strong V1  3-Obtuse Strong U2  etc. |
| 4 | 150≤\|Θ\| < 150 | 4-] 1'  4-] 1'  4-U1'  4-Strong U1'  4-Wedge 1"  4-Strong J1'  4-Strong L1'  4-Strong L2'  4-Strong LJ4  4-Strong U1'  4-Strong V1'  4-Obtuse U11  4-Wedge 1"  4-Wide U1'  4-Obtuse U2  etc. |
| ⋮ | ⋮ | ⋮ |

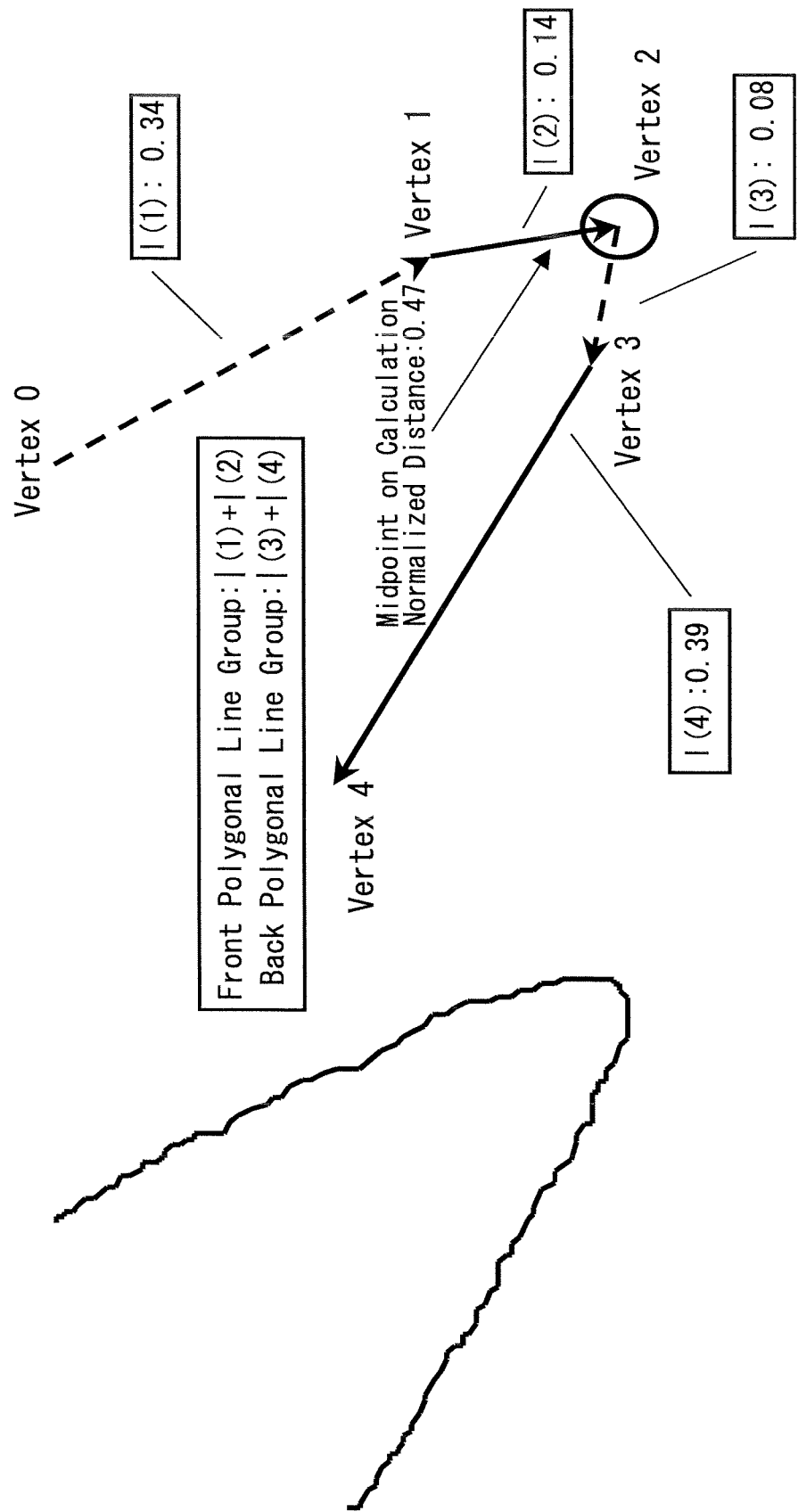

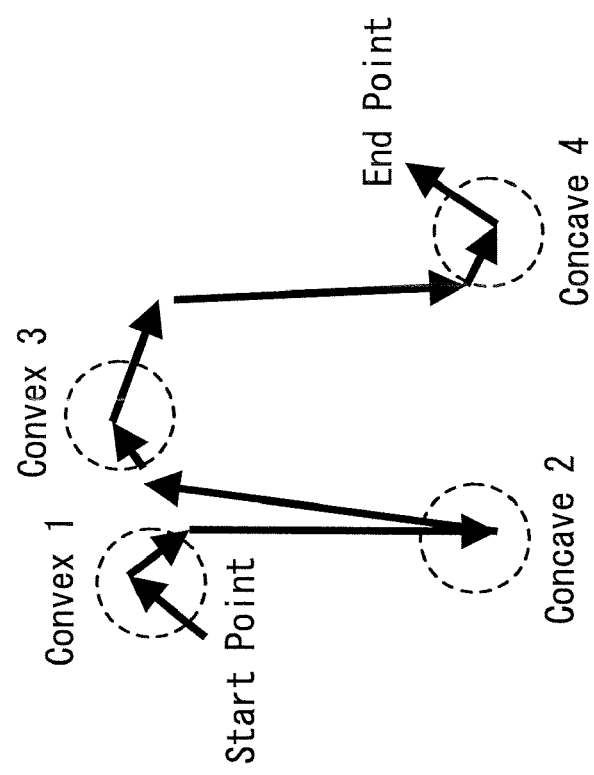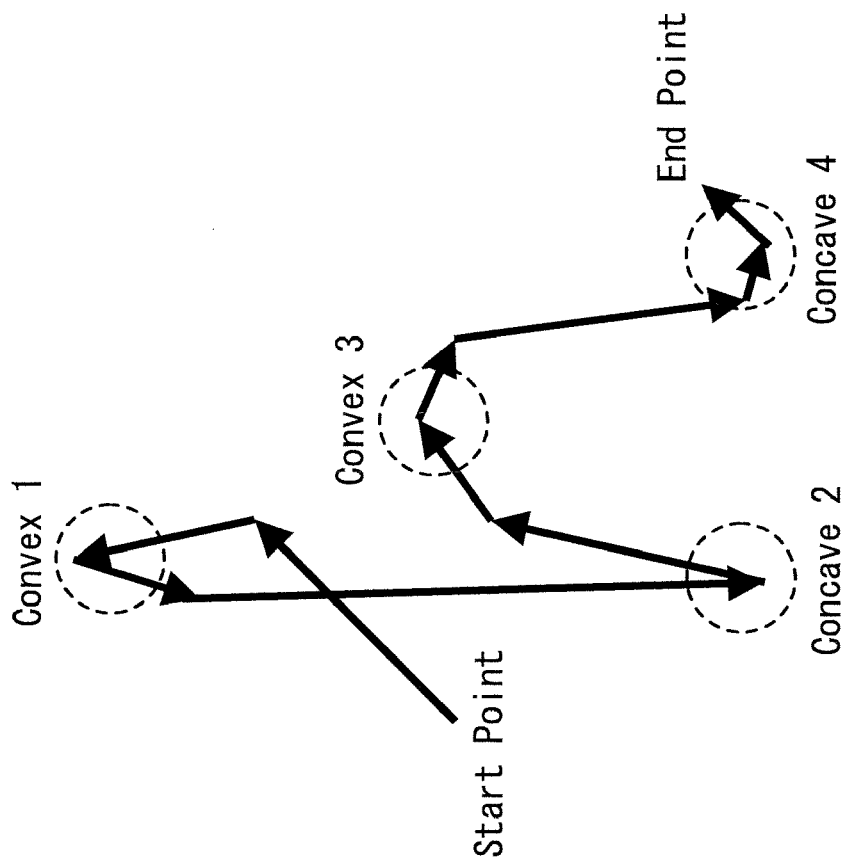
FIG. 35A
FIG. 35B

METHOD FOR HANDWRITTEN CHARACTER RECOGNITION, SYSTEM FOR HANDWRITTEN CHARACTER RECOGNITION, PROGRAM FOR HANDWRITTEN CHARACTER RECOGNITION AND STORING MEDIUM

TECHNICAL FIELD

The present invention relates to handwritten character recognition by which an online handwritten character recognition is performed.

BACKGROUND ART

Up to now, many systems for character recognition have been proposed and commercialized, utilizing two basic principles, one of which is a structural analysis and the other is at a pattern matching. As for the former, generally the system for recognition is not heavy, therefore it can be applied to a case where input restriction is strong, specifically an object where the number of strokes and/or the stroke order are constant. On the other hand, the latter is applied to both cases, a case in which the number of strokes and the stroke order are free or a case near to that.

A method utilizing structural analysis is disclosed in the "Online real-time recognition for handwritten number/katakana character", Transaction of Institute of Electronics, Information and Communication Engineers, 56-D, 5, PP. 312-319, and Japanese Unexamined Patent Publication No. S59-131972 issued by Japan patent Office, in which a so-called basic stroke system is described. The stroke is classified to a simple stroke (four kinds) and a complex stroke (seven kinds) and is recognized by a discriminating automaton, and consequently though it is simple, there are problems creating a dictionary or dealing with continuous characters and simplified characters, and also there is a problem for the possibility.

The pattern matching method includes two kinds of methods roughly separately. As disclosed in "Online recognition for handwritten character by a point approximation for stroke" in Transaction of Institute of Electronics, Information and Communication Engineers, J63-D, 2, PP. 153-160, one method is that the stroke is approximated with a few points and these are made to be feature points. Also the moving directions of the stroke at end point are estimated and those are also made to be feature points, and feature vectors are formed. Dictionaries are disassembled to strokes having feature vectors, and the correspondence of input vectors and the feature vectors prepared for each category is taken. And, as for the dictionaries in which the correspondence was taken, the distance is calculated, and a name of the dictionary that gives a minimum distance is a character's name, and basically it is free to the stroke order or number of strokes.

There is another pattern matching method, which is described in "Hand written character recognition by Rubber String Matching Method" disclosed in a technical paper PRL74-20 of Technical Committee on Electronics and Communications as original paper of the corresponding system to feature points, and also as disclosed in Japanese Unexamined Patent Publications No. S57-45679 and No. H8-24942 issued by Japan patent Office. This method involves taking the correspondence of the feature point vectors of input character and dictionary by a DP (Dynamic Programming) method, which is used as the main stream in the online recognition of the handwritten character.

It should be noted that offline character recognition technology has been applied to online character recognition technology recently.

Specifically, there is OCR technology that has been accumulated up to now, and this is able to be used for the online character recognition.

From this standpoint, when seeing the OCR technology, the mainstream is a directional feature matching technology. There are a large number of papers about such technology, but the fundamental method exists in one improvement of correlative method", Transaction of Institute of Electronics, Information and Communication Engineers, J62-D, 3, PP. 217-224, for example. The fundamental difference between this method and the method of structural analysis, is that the feature is generally assigned to a grid plane of n×m, and the feature distribution on this plane is made to be an representation of the final input character, and the (n×m) is scanned to the right from the left corner, for example, and is made to be vector of n×m dimensions. The discrimination is that the inner product (similarity) between a standard directional feature vector and an input character directional vector is calculated and a category's name of a standard directional feature vector with the highest value is made to be an answer. In this case, especially, to a handwritten character with remarkable transformation, the preprocessing of advanced nonlinear normalization is performed. The reason that this is needed is because this method makes the grid plane of n×m a basic framework. An advantage of this method is generally that an advanced theory of discrimination may be used, because a vector space, specifically Hilbert spatial theory, is applied. Also, it is strong for the noise if it says practicably. However, it may kill the biggest advantage of on-line usage, specifically the easiness of segmentation. In the off-line situation, for example, even if many pieces of characters are written in the same place, a machine could be made to recognize those. Also, for real remarkable transformation, even the advanced nonlinear normalization is not sufficient and, for example, for the rotational transformation, the normalization with considerably advanced and considerable computational amount is required. There is a detailed description of this issue in the chapter 3 of S. Mori, H. Nishida, H. Yamada, "Optical Character Recognition", Wiley.

By the way, for example, it is possible to take a curvature, as the feature of the above. From this viewpoint, in "one of improvements of the correlative method for character recognition", IEICE Transaction, J-62, 3, PP. 217-224], especially because "g" and "y" cursive style and the Arabic numeral "9" are easily mistaken in the handwriting, these are named as the rotational feature, and the tangential angle differences of curved portions are determined and are suitably quantized and the character is represented by the directional feature vector of related art and the local rotational feature vector and all-feature vector that summarizes them is determined and gradational processing is performed (this is actually performed on the grid plane). And, a method in which a gradational all-feature standard vector is determined in each category and the similarity calculation is performed and answer is obtained has been proposed. By the way, in the standpoint of structure analysis, the "g" and "y" cursive style and the Arabic numeral "9" are fairly different. It is because the structure of upper portion is seen to the positive. However, in feature matching, because those are mixed in the process of the inner product and are made to be one scalar quantity, the structure of upper portion is seen to the negative, and because the three characters have a strong straight line structure, these are buried to this straight line. Therefore, a localized feature surface is expressly prepared. However, as will be mentioned later, by means of our method, the above so-called rotational feature is determined in a large area, "is not local", and is represented naturally easily with a consistent form. Therefore, the above three kinds of characters are able to be recognized very easily.

An immutable recognition system to the rotation is desired to the object in the wide area, for example, a figure, a body placed on the logistics system, or an airplane or the like, in the military technologies.

Accordingly, the research is being continued from the past, and many papers are disclosed at even the present. As for research up until 1990, such is described in detail in Fundamental of Image Recognition (II) by coauthors, S. Mori; T. Itakura, and also, as for research up until 1999, such is described in detail in Optical Character Recognition by coauthors: S. Mori; H. Nishida; H. Yamada. The main focus of those research projects are the moment method in which the moments with high degree are combined so that the phase angles are offset. Also, there is the application of Fourier transform method that is so-called Fourier descriptors, and this research is prospering by reflecting that recent PCs have becomes very high speed. But such applications are not appearing in the market yet for practical use. And, on the other hand, other than those streams, in the "Online Handwritten Figure Recognition System without depending on the number of strokes, stroke order, rotation and delimitation", Journal of Information Processing Society of Japan, 27-5, May. 1986, the object is approximated by the linear line segment and arc sequences and is represented by the relative angle changes of those and the object (input figure) correspondence to the same representation of the dictionary is taken, and the mutual distances are measured by the sum of the absolute values of the difference of each angle change, and consequently the recognition system is made to be immutable to rotation. And, however, a disadvantage is present in that it is weak to the detection of acute angle, as is described in the paper itself.

A so-called matching method is a feature (for example, a direction of stroke) matching on 2-dimensional plane where a character is placed. Also, the online handwritten character recognition is a DP (Dynamic Programming) matching or Flexible string matching in another name. As for the former, the distribution of features on 2-dimensions is represented with vectors and the distance between characters is defined by the inner product of those vectors. The character recognition is carried out with the statistical technique as the discrimination issue on the vector space that is defined by the inner product. As for the latter, the matching of simple superposition is expanded and the character recognition is carried out by adaptationally and flexibly matching the input character to the standard character.

Other than such methods, generally, the character recognition referred to as structural analytical methods have been studied. Such methods may be applied for general figures and is a good method, but it needs the symbolization of the subject that is the general figure specifically, and consequently the matching is carried out by the symbol. However, there is a problem in this symbolization, and the flexibility is lost by the symbolization and also the design may not be done mechanically, and consequently the research and development has deadlocked. For example, the above "Online real-time recognition for handwritten number/katakana character", Transactions of Institute of Electronics and Communication Engineers, 56-D, 5, :PP. 312-319, was disclosed in 1973, and therefore is old. At this stage, a clockwise/counterclockwise of the online character was used as the feature, but all these sequences were symbolized. Those sequences were detected by the increase/decrease of X-coordinate value of an input pattern and were represented with eleven symbols. Such symbolic representation is not flexible, and is partially used only in the special case, actually. Subsequently, an algebraic idea that gave a united viewpoint was introduced to the structural analytical method by the "Algebraic structure representation of shapes", in Transaction of Institute of Electronics and Communication Engineers, J64-D, 8, P705-712, in 1981, and a practical algebraic system was constructed by the "Algebraic Description of Curve Structure", IEEE Trans. on Pattern Analysis and Machine Intelligence, Vol. 14, No. 5, PP. 1029-1058, in 1992, but it was still symbolic representation. The structural analytical method has stayed at the symbolic representation level, like that. In order to break through this barrier, although it has been known in the art that the analysis should focus not on a symbol but it must focus on an analogue, a specific method relating to the analogue has not been found up to now.

On the other hand, the above techniques of the past have basic problems such as following.

The structural analysis is simple, but there is no flexibility and there is a problem at the boundary of the basic pattern and it is discrete and awkward and it is troublesome to need to prepare a dictionary.

The processing of the pattern matching method, specifically the DP method, is heavy.

The pattern matching method only reads it during offline recognition, specifically it is a main purpose that assigns an input character to a dictionary, and the correspondence to the cause/result is not seen and the misreading that is hard to understand is caused sometimes and it is not rare that the cause is not understandable to a designer.

SUMMARY OF THE INVENTION

The present invention belongs to the structural analytical method basically, but improves the problems associated with methods up to now and gives the fundamentals of flexible structural analytical method and, therefore, is able to avoid the problem of symbolization, to represent the structure in the analogue and to perform a flexible and simple matching to the standard.

In order to achieve such a method, a first embodiment is provided that is a handwritten character recognition method by which an online handwritten character is recognized, characterized by: capturing an input handwritten character with parameter representation for each stroke and applying a polygonal approximation to each stroke; assuming each polygonal line segment approximated by the aforesaid polygonal approximation to be vector that reaches an end point from a start point, and obtaining an angle between an axis that becomes a reference and the aforesaid each line segment as a polygonal line segment angle sequence; obtaining an exterior angle sequence of vertices of the obtained polygonal line segments; making a sum of exterior angles of the same sign where the same sign of plus or minus in the aforesaid exterior angle sequence continues to be a winding angle sequence; extracting a global feature according to the aforesaid each obtained sequence and a localized or quasi-localized feature in each curved portion divided corresponding to the aforesaid winding angle sequence, hierarchically and divisionally; and performing the character recognition by comparing this extracted result with a template of object character for recognition that is provided in advance.

Also, an additional embodiment includes performing recognition processing by dividing each term into a pre-winding angle and a post winding angle before and after a loop of curve formed with the aforesaid winding angle sequence.

Further, an additional embodiment is characterized in that the aforesaid template of object character for recognition is data in which each element of sequence and ranges of upper and lower limit of each feature are determined from learning data.

Further, an additional embodiment includes obtaining an ends-length ratio, intermediate length, intermediate maximum length, distribution of elements of length and feature of distance between start point and end point, by using a sequence in which lengths of polygonal line segments are elements, a sequence which is normalized by the total length and a coordinate sequence in which start point, vertices and end point are elements, as the aforesaid polygonal approximation representation.

Further, an additional embodiment includes setting frame structure of a character quantitatively from a weighted average angle of polygonal line segments in a predetermined section, feature of exterior angle sequence or value of boundary term, detection of inflection point, distance between start point and end point, distance among start point, end point and inflection point.

Further, an additional embodiment includes discriminating characters by constituting a discriminating hyperplane from each learning data on a partial multidimensional feature space formed with features inside of the winding angle area of each term of the winding angle sequence and among the winding angle areas.

Further, an additional embodiment includes:

taking a length sequence as one of axes from the exterior angle sequence of each element of the winding angle sequence and also from length sequence equivalent thereto; taking a cumulative angle of the exterior angle sequence as the other axis and constituting a graph by implementing a linear interpolation; and obtaining a global feature of curved condition by constituting a cumulative angle feature function that finds out a distance continuously as a function of distance from start point of the element and as making the winding angle a function or reversely as a function of the winding angle.

Further, an additional embodiment includes obtaining positional relations among two or more strokes quantitatively, by obtaining intersections between straight line groups including a representative polygonal line segment of each stroke or an extended line of a set of polygonal line segments.

Further, an additional embodiment is characterized in that the polygonal line segments that are shorter than a predetermined length are disregarded in the aforesaid normalized sequence.

Further, an additional embodiment includes:

dividing an object character into two or more portions by using pattern of change of adjacent polygonal line segment angles or the cumulative angle feature function of the aforesaid polygonal line segment angle sequence inside the winding angle of each term of the winding angle sequence; and using features of the portions or boundary points to a comparison with an object character for recognition.

Further, an additional embodiment includes:

obtaining a point as midpoint on a curve corresponding to a half of the winding angle of the curve including each term of the aforesaid winding angle sequence; dividing the curve into each term at that front/back; obtaining a subtle feature of curve extracted from each divided polygonal line segment group; and raising the recognition accuracy.

Further, an additional embodiment provides a character recognition system in a handwritten character recognition by which an online handwritten character is recognized, characterized by including:

input means for inputting a handwritten character online;

polygonal approximation means for capturing data input by the aforesaid input means with parameter representation for each stroke and implementing the polygonal approximation to each stroke;

processing means for assuming the aforesaid each polygonal line segment approximated by the aforesaid polygonal approximation means to be vector that reaches an end point from a start point, obtaining an angle between an axis that becomes a reference and the aforesaid each polygonal line segment as a polygonal line segment angle sequence, obtaining an exterior angle sequence of vertices of the aforesaid polygonal line segments, and making a sum of exterior angles with the same sign, where the same sign of plus or minus in the aforesaid exterior angle sequence continues, to be a winding angle sequence; and recognition means for extracting a global feature according to each sequence obtained by the aforesaid processing means and a localized or quasi-localized feature in a winding angle area of each term in the winding angle sequence hierarchically and divisionally, and performing the character recognition by comparing the extracted result with a template of an object character for recognition that is provided in advance.

An additional embodiment provides a handwritten character recognition program recognizing online handwritten character, characterized by including the steps of:

capturing an input handwritten character with parameter representation for each stroke and implementing a polygonal approximation to each stroke;

obtaining an angle between an axis that becomes a reference and the aforesaid each polygonal line segment as a polygonal angle sequence by assuming each polygonal line segment approximated by the aforesaid polygonal approximation to be vector that reaches to an end point from a start point;

obtaining an exterior angle sequence of vertices of the polygonal line segments that are obtained;

making a sum of exterior angles with the same sign, where the same sign of plus or minus in the aforesaid exterior angle sequence continues, to be a winding angle sequence; and extracting a global feature according to the aforesaid each obtained sequence and a localized or quasi-localized feature in a winding angle area of each term of the winding angle sequence hierarchically and divisionally and performing the character recognition by comparing the extracted result with a template of an object character for recognition that is provided in advance.

An additional embodiment provides a storage medium capable of recognizing online handwritten characters by stored program installed in a predetermined arithmetic processing device, the stored program characterized by including the steps of:

capturing an input handwritten character with parameter representation for each stroke and implementing a polygonal approximation to each stroke;

obtaining an angle between an axis that becomes a reference and the aforesaid each polygonal line segment as a polygonal angle sequence by assuming each polygonal line segment approximated by the aforesaid polygonal approximation to be vector that reaches to an end point from a start point;

obtaining an exterior angle sequence of vertices of the polygonal line segments that are obtained;

making a sum of exterior angles with the same sign, where the same sign of plus or minus in the aforesaid exterior angle sequence continues, to be a winding angle sequence; and extracting a global feature according to the aforesaid each obtained sequence and a localized or quasi-localized feature in a winding angle area of each term of the winding angle sequence hierarchically and divisionally and performing the character recognition by comparing the extracted result with a template of an object character for recognition that is provided in advance.

According to these embodiments, problem of symbolization is avoided and a structure is represented in analogue and the flexible and simple matching to the standard are able to be done. Also, because a structural analysis is implemented, inevitably the object is able to be described suitably and the correspondence to the cause/result is evident from the vision of a human being. Therefore, evaluation of the shapes of object such as characters is able to be done and a correct refusal range is able to be set up and a recognition system having an ability that is close to a human being more is able to be provided.

BRIEF DESCRIPTION OF THE DRAWINGS

FIG. 6 is an explanatory drawing showing polygonal line segment angles according to an embodiment of the present invention;

FIG. 7 is an explanatory drawing showing polygonal line segment angles and exterior angles according to an embodiment of the present invention;

FIGS. 12A to 12C are explanatory drawings showing an example (example of 2) of plus or minus decomposition of a winding angle according to an embodiment of the present invention;

FIGS. 13A to 13C are explanatory drawings showing an example (example of 7) of plus or minus decomposition of a winding angle according to an embodiment of the present invention;

FIG. 17 is an explanatory drawing showing an example (example of U) of cumulative angle feature function according to an embodiment of the present invention;

FIG. 18 is an explanatory drawing showing an example (example of J) of cumulative angle feature function according to an embodiment of the present invention;

FIGS. 19A to 19D are explanatory drawings showing examples of curvature of a top portion according to an embodiment of the present invention;

FIG. 21 is an explanatory drawing showing an example of winding angle sequence according to an embodiment of the present invention;

FIGS. 29A and 29B are explanatory drawings showing an example of detection of a midpoint according to an embodiment of the present invention;

FIGS. 35A and 35B are explanatory drawings that illustrate frame structure according to an embodiment of the present invention.

BEST MODE FOR CARRYING OUT THE INVENTION

Embodiments of the present invention are explained with reference to attached drawings, hereinafter.

Figure 1:
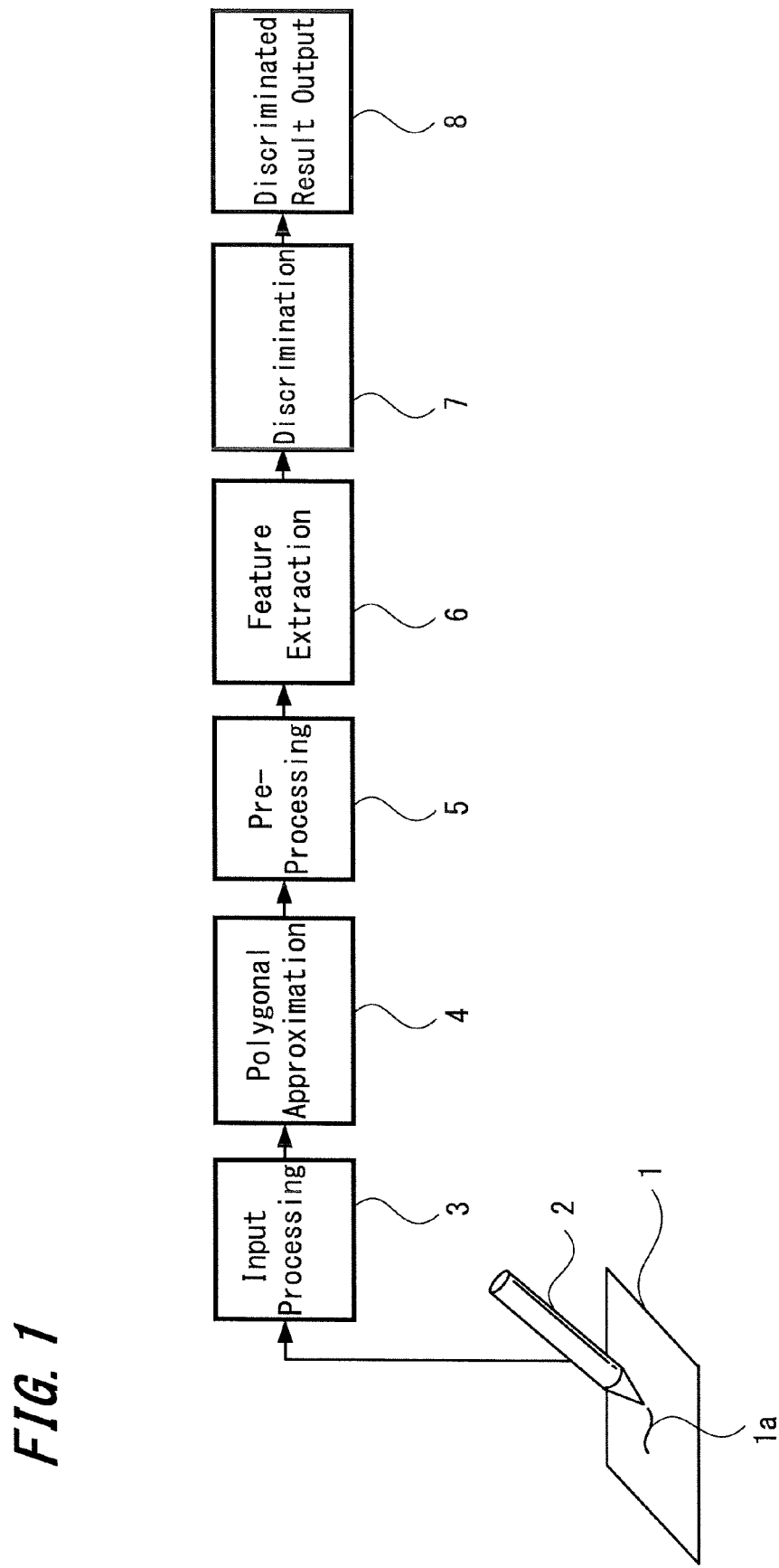
FIG. 1 is a configuration diagram showing an example of system according to an embodiment of the present invention.

In the embodiments, it is applied to a system to which the online handwritten character recognition is performed and an example of constitution of a case in which each processing portion is made to be a hardware configuration is shown in FIG. 1. It should be noted that each processing portion is allowed to be an individual processing portion, as shown in FIG. 1, but it may be a configuration in which each processing portion is performed with a common arithmetic processing portion or the same handwritten character recognition may be performed by installing the one which programmed the handwritten character recognition of the embodiment to an arithmetic processing apparatus of general purpose such as a personal computer apparatus.

Also, in the following explanation, each concept necessary to the handwritten character recognition in the embodiments is defined with the terminologies shown in the next Table 1.

TABLE 1

Definition of terms

| Terms | Definition | Notation example |
|---|---|---|
| Polygonal line angle | Angle of polygonal line measured anti-clockwise from horizontal line drawn to positive direction of x axis from a start point of each polygonal line. | $\theta$ |
| Polygonal line angle sequence | A sequence of polygonal line angles being in one stroke. | $(\theta 1, \theta 2 \ldots \theta n)$ |
| Polygonal line exterior angle | Difference between polygonal lines of front/back. But, in case that absolute value of the difference exceeds 180°, (1) difference - 360° in case that the difference is positive, (2) 360° in case that the difference is negative. | $\Delta$ |
| Polygonal line exterior angle sequence ($\Delta$ sequence) | A sequence of polygonal line exterior angles being in one stroke. | $(\Delta 1, \Delta 2 \ldots \Delta n)$ |
| Winding angle | Sum of continuous polygonal line exterior angle of the same sign | $\Theta$ |
| Winding angle sequence | A sequence of winding angles being in one stroke. | $(\Theta 1, \Theta 2 \ldots \Theta n)$ |
| Pre-winding angle | Winding angle from a start portion to the intersection, in a case that there is intersection in one element having a winding angle sequence. | Pre $\Theta$ |
| Post-winding angle | Winding angle from an end portion to the intersection, in a case that there is intersection in one element having a winding angle sequence. | Post $\Theta$ |
| Length sequence | A sequence where normalized length is made to be element. | |
| Partial length sequence | A length sequence divided according to boundary of plus/minus $\Delta$ sequence. | |
| Partial $\Delta$ sequence | $\Delta$ sequence divided according to boundary of plus/minus $\Delta$ sequence. | |
| Start portion | An element of beginning of a length sequence or $\Delta$ sequence. | |
| End portion | An element of end of a length sequence or $\Delta$ sequence. | |
| Length of start portion | A normalized length of a start portion of a length sequence. | lstart |
| Length of end portion | A normalized length of an end portion of a length sequence. | lend |
| Intermediate Length | Sum of lengths of elements being between a start portion and an end portion in a length sequence. | |
| Ratio of length sequence ends-lengths (ends-length ratio) | Length of start portion/length of end portion. | lstart/lend |
| Maximum length of length sequence ends | Maximum length of element being between a start portion and an end portion in a length sequence. | Max{lstart, lend} |
| Sum of intermediate lengths between length sequence ends | Sum of intermediate lengths. | |
| Intermediate maximum length | Maximum length in intermediate lengths. | |
| Maximum value of $\Delta$ sequence | Maximum value in elements of $\Delta$ sequence. | Max $\Delta$ |
| Ratio of $\Delta$ values of ends | Ratio with a first element and a last element of $\Delta$ sequence | $\Delta$ ends ratio |

TABLE 1-continued

Definition of terms

| Terms | Definition | Notation example |
|---|---|---|
| Both ends angle difference | Δ value of both ends in case of connecting these imaginatively, as taking polygonal lines of both ends in line sequence. | |
| Cumulative angle characteristic function | A linear interpolation function constituting with length sequence and Δ sequence, and argument is length and function value is angle (winding angle). In this inverse function, argument is angle (winding angle) and function value is length. This is called a cumulative length characteristic function and both summarized is called cumulative characteristic function. | |
| α degree length of start portion | A distance from a start point to a point where winding angle becomes α°, by starting from a start portion in Δ sequence. Actually, it is found out from a cumulative length characteristic function. | |
| α degree length of end portion | A distance from an end point to a point where winding angle becomes α°, by starting from an end portion in Δ sequence. Actually, it is found out from a cumulative length characteristic function. | |
| α degree length ratio | Min{α degree length of start portion, α degree length of end portion}/Max{α degree length of start portion, α degree length of end portion} | |
| Λ length start portion degree | Winding angle from a start point to a point of Λ length, by starting from a start portion in length sequence. | |
| Λ length end portion degree | Winding angle from an end point to a point of Λ length, by starting from an end portion in length sequence. | |
| Λ length degree ratio | Min{Λ length start portion degree, Λ length end portion degree}/Max{Λ length start portion degree, Λ length end portion degree} | |
| Midpoint of winding angle | Vertex nearest to α degree length where a half of object winding angle is made to be α in winding angle including a convex point and concave point of a object character. | |
| Front polygonal line group | Polygonal line group from a start point of object winding angle to a branching point where a midpoint is made to be a branching point. | |
| Back polygonal line group | Polygonal line group from a branching point where a midpoint is made to be a branching point to an end point. | |
| Front total length | Total length of front polygonal line group. | |
| Back total length | Total length of back polygonal line group. | |
| Weighted average angle | Angle to be obtained by [l(1) × θ(1) + l(2) × θ(2) + ... l(n) × θ(n)] ÷ N, in polygonal line group of front/back. l(n) is polygonal line sequence, θ(n) is each sequence and N is respective total length of front and back. | θ(pre) is weighted average angle of front polygonal line group, θ(pro) is weighted average angle of back polygonal line group |
| Both ends average narrow angle difference | (θ(pre) + 180) − θ(pro)) | θsp |
| Angle dispersion of front/back polygonal line group | Angle dispersion of front polygonal line group = [(θ(1) − θ(pre))² × l(1) + (θ2 − θ(pre))² × l(2) ... + (θn − θ(pre))² × l(n)] ÷ N, l(n) is polygonal line sequence, θ(n) is each sequence and N is respective total length of front and back. (θ(pro) is used in case of back polygonal line group.) | |
| Balance of polygonal line group | Min(front total length, back total length)/Max(front total length, back total length) | |
| Curvature of top portion | Characteristic quantity to distinguish "U" and "V", for example, and curvature of top portion. Actually, it is a value of ratio that winding angle of problem portion is divided by length of top portion. | |
| Abstract figure map | That a character is captured as a general figure and is classified by basic rotation invariant features. This is layered by | |

TABLE 1-continued

Definition of terms

| Terms | Definition | Notation example |
|---|---|---|
| | winding angle hierarchically and characteristic figure is arranged with basic features for each layer, thereby being able to get a bird's-eye view of figure. More secure recognition is able to be implemented by using this. | |
| General intersection | General term of intersection that is not necessary to be on a real line. | |
| Imaginary intersection | Imaginary intersection that is made on extension of two line segments. | |
| Quasi-imaginary intersection | Intersection of two line segments, which is on one line segment or edge point and on an extension of the other line segment. | |

As the embodiment shown in FIG. 1 is explained, a character is written with a pen 2 on a paper 1, and strokes of a brush (handwriting) 1a on the paper 1 are detected at the pen 2 side. The detection of the strokes of the brush 1a is performed by a camera included in the pen 2, for example. Alternatively, a movement of pen 2 itself may be detected from an acceleration sensor or the like. It is not detected at the pen side, but it may be a configuration in which the handwriting is able to be detected electrically by constituting the paper 1 side with some panel. Anyway, it is a configuration in which the change in handwriting according to the passage of time is able to be determined because it is the online handwritten recognition in case of the embodiments.

Data of the handwriting detected by the processing is sent to an input processing portion 3 and input processing for detecting character information is performed. The input data is sent to the following: a polygonal approximation portion 4; a pre-processing portion 5; a feature extracting portion 6; a discriminating portion 7; and a discriminated result output portion 8, and the corresponding processing in each processing portion is performed, and finally the output processing such as a display of the character discriminated and an output of character code discriminated or the like is performed in the discriminated result output portion 8.

Figure 2:
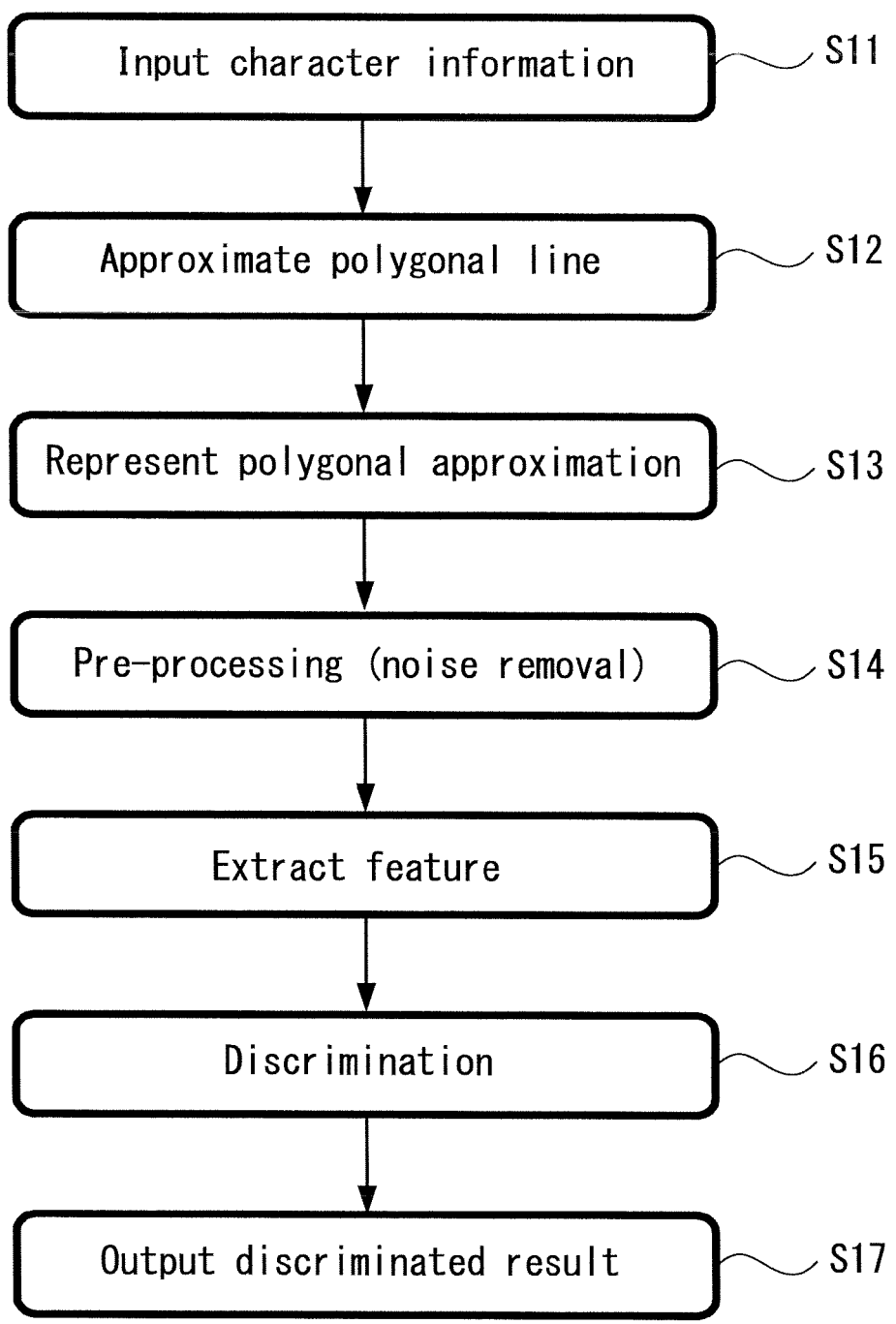
FIG. 2 is a flowchart showing an example of processing of a whole of character recognition according to an embodiment of the present invention.

A flow chart in FIG. 2 shows an example of whole processing in the character recognition of the embodiment. It is explained according to FIG. 2, as the following, a pattern of character/figure that is input from the input processing portion 3 (Step S11) is approximated by the polygonal line segment at the polygonal approximation portion 4 (Step S12). From this approximation, the input pattern is represented as vectors in which lengths, directional angles and difference between directional angles of adjacent polygonal line segments are elements by assuming each polygonal line segment as a vector (Step S13). Also, a sum of the difference in the angles of the same signs is determined from vector representation of the difference in the directional angles, and here, vector representation named a winding angle is determined as one element including the signs. From this result, very short point-shaped patterns, very short polygonal line segments and components of the difference in the directional angles with a very small value are modified at the pre-processing portion 5 (Step S14). Subsequently, from the polygonal approximation representation at the feature extraction portion 6, according to the situation, the features are extracted (Step S15), and on the basis of the extracted result of the features, the character recognition is performed (Step S15) and the character recognition result is output (Step S17).

Figure 3:
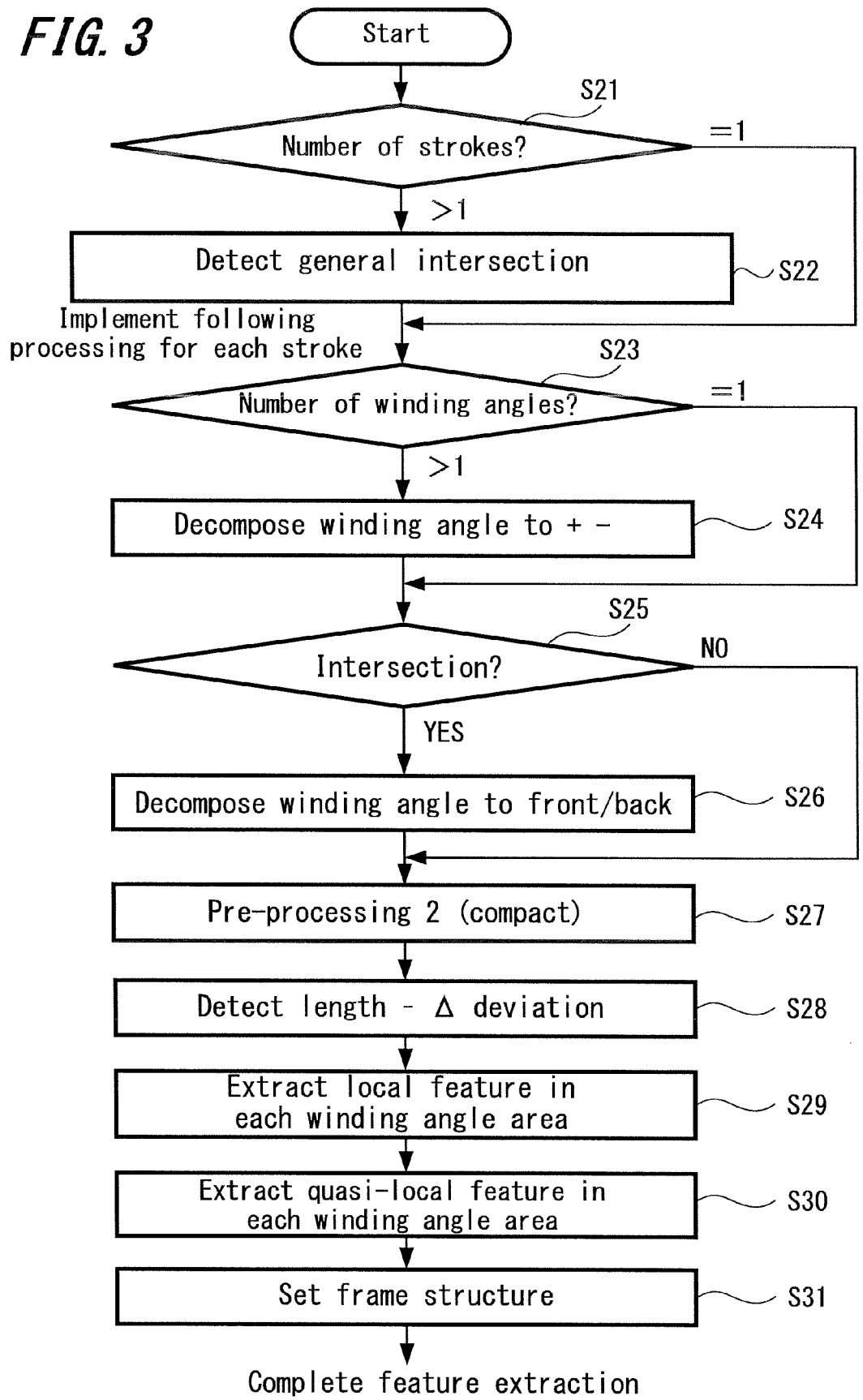
FIG. 3 is a flowchart showing an example of feature point detection processing of according to an embodiment of the present invention.

Here, an example of detail of the character recognition processing in the step S15 is explained with reference to a flow chart in FIG. 3. First, the number of strokes is checked (Step S21). In here, the number of strokes is classified to a case of one or a case of two or more. If the number of strokes is two or more, general intersection detection is carried out (Step S22). And the number of elements is classified to a case of one or a case of two or more by the winding angle representation (Step S23). If the number of elements is two or more by the winding angle representation, decomposition of plus (+)/minus (−) of winding angles is performed (Step S24).

Further, whether or not there is an intersection is checked (Step S25). If there is an intersection, one winding angle element is disassembled to three portions on a boundary of the intersection as winding angle front/back disassembling processing (Step S26). Specifically, these are a loop portion that is formed by the intersection, a portion from a start portion to the intersection and a portion from the intersection to an end portion.

Furthermore, according to a pattern of character/figure, in order to find out the features more briefly and efficiently, the processing by which more compact polygonal approximation representation is obtained is performed, as the pre-processing 2 (Step S27). Also, the uniformity of elements of length sequence vector and Δ sequence vector is checked, as a length—Δ deviation detection (Step S28), and this is used to the discrimination.

Next, the localized features inside of each winding angle area is extracted (Step S29), and furthermore the quasi-localized features is extracted (Step S30), and the framework structure of a whole character is set up and the processing is performed hierarchically and divisionally (Step S31).

Figure 4:
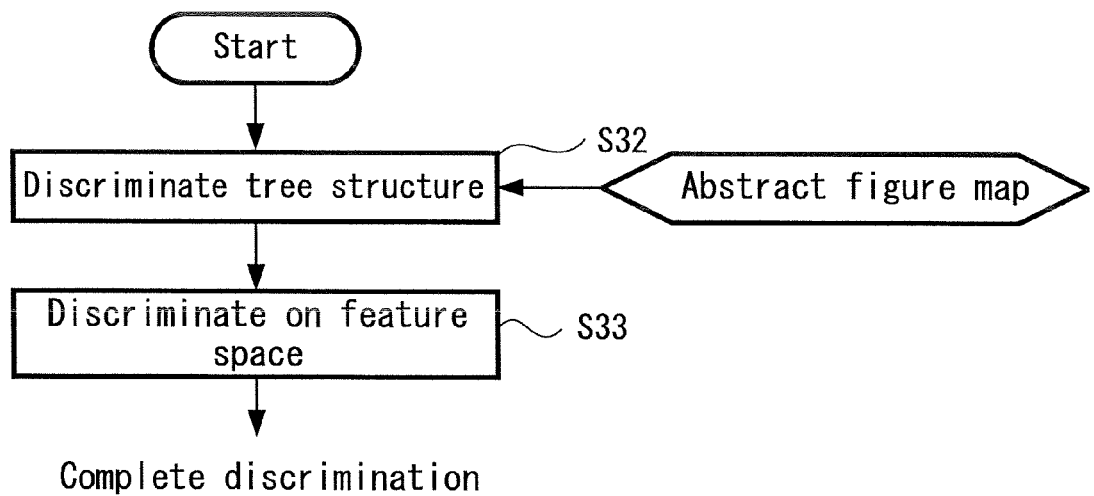
FIG. 4 is a flowchart showing an example of discrimination processing according to an embodiment of the present invention.

On the other hand, if the above feature extraction is performed, the discrimination is performed briefly and speedy by using a decision tree based on the decision tree structure, by the discrimination processing of the step S16 in FIG. 2. Specifically, as shown in FIG. 4, the discrimination of the tree structure is performed by using the object figure-map (Step S32), and in a case of shapes neighbored, the discriminating method on a small dimensional space based on a function/vector space on a feature space is used and the discrimination is performed (Step S33).

Next, details of specific processing in each step are explained with reference to FIG. 5 and subsequent drawings. Here, in explanation of the principle of the embodiment of the present invention, as an example in which the principle is most understandable, an example in which Arabic numbers 0, 1, 2, . . . 9 are character-recognized mainly is explained.

First, detection of the winding angle is explained.

As for the representation of an object character curve in the embodiment, first, the polygonal approximation of strokes of a character that is obtained from an observation apparatus is performed. As for the polygonal approximation itself, there have been many researches already. In those, a suitable method is used. Here, for example, the method by U. E. Ramer that was disclosed in 1972 is supposed. This method is a simple, clear method, and it may be said that it is most known method. Then, the explanation is begun from the stroke approximated by the polygonal line segments.

Figure 5:
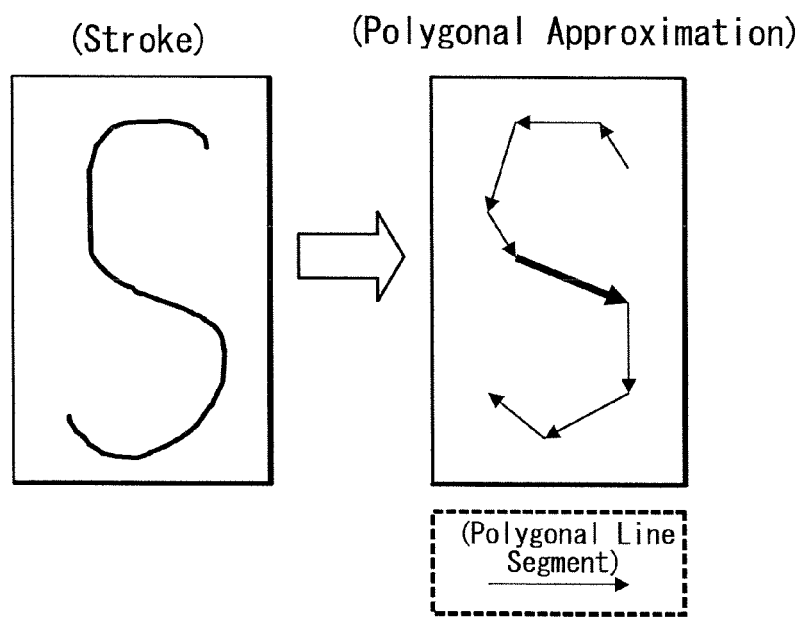
FIG. 5 is an explanatory drawing showing an example of each stroke and polygonal approximation according to an embodiment of the present invention.

First, as shown in FIG. 5, at first, the polygonal approximated stroke begins from a start point of the writing beginning and an end point of the first polygonal line segment is a vector representation that is indicated by an arrow as a direction's indication. A left side in FIG. 5 is a stroke written with a pen, and a right side in FIG. 5 is the one approximated by polygonal line segments. A polygonal line segment connected to the vector representation of the first polygonal line segment is a vector representation, too, and those are represented by a vector in order and it ends at the end of the stroke, finally.

Here, an angle of each polygonal line segment is measured anticlockwise from the horizon drawn to the positive direction of an x axis (Horizontal axis), from the start point of each polygonal line segment, as shown in FIG. 6. Therefore, an angle of an upward polygonal line segment from the origin is +90°. An angle of a downward polygonal line segment from the origin is −90°. An angle of a polygonal line segment that faced to the negative direction of the x axis from the origin is +180° or −180°. Here, both are in accord. Therefore, the range of angle θ is −180° to +180°. It should be noted that in the following explanation, there is a case in which a unit [°] is omitted and only the number is indicated in case of indication of angle.

Next, a polygonal line segment exterior angle of vertex is determined from this polygonal line segment angle. specifically, for example, as shown in FIG. 7, if an angle between the x axis and a first vector is made to be an polygonal line segment angle θ1 and an angle between the x axis and each vector is made to be θ2, θ3 . . . , in order, a first exterior angle Δ1 becomes Δ1=θ1−θ2, and it is able to be determined by a difference between polygonal line segment angles of front/back. A next exterior angle Δ2 becomes Δ2=θ2−θ3. As doing the same as the above, as shown in FIG. 7, ((θ1−θ2), (θ2−θ3), . . . (θn−1−θn)) is determined as an exterior angle sequence of vertices of the polygonal line segments, and these are simply displayed with (Δ1, Δ2, . . . Δm). If a manner of writing of a curve is counterclockwise, or it is clockwise, these exterior angles take plus + or − quantity, but a sum of the exterior angles of those continuous same signs is displayed with (Θ1, Θ2, . . . Θp), as a winding angle sequence. To calculation in here, it should be paid attention that a main value of angle is from +180 to −180, and actually ±180 are indicating the same angle. Therefore, a difference is determined and if the absolute value exceeds 180: the value is made to be (Δ−360) when is positive; and the value is made to be (360−|Δ|) when Δ is negative.

It should be noted that, here, ((θ1−θ2), (θ3−θ2), . . . (θn−θn−1)) is determined as an exterior angle sequence of vertices of the polygonal line segments and these may be simply displayed with (Δ1, Δ2, . . . Δm). In a case of the display like this, though it has a unity as a cord system, here an example in which a clockwise code is made + particularly is presented.

Figure 8A:
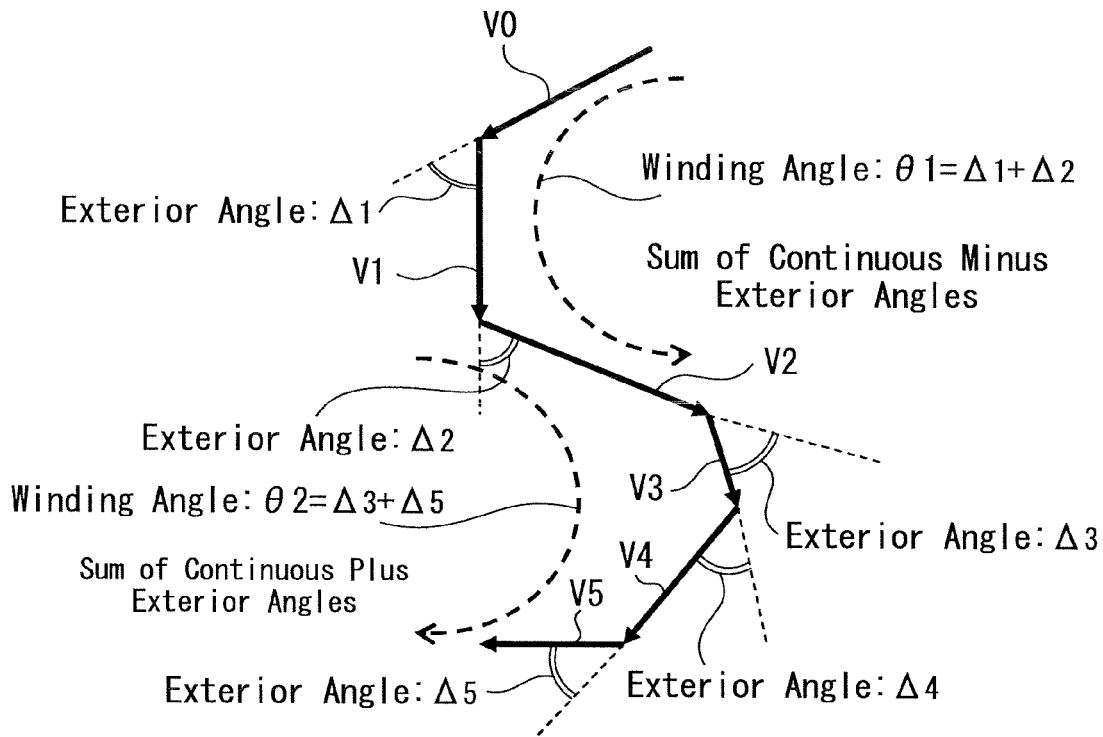
FIGS. 8A and 8B are explanatory drawings showing winding angles according to an embodiment of the present invention.
Figure 8B:
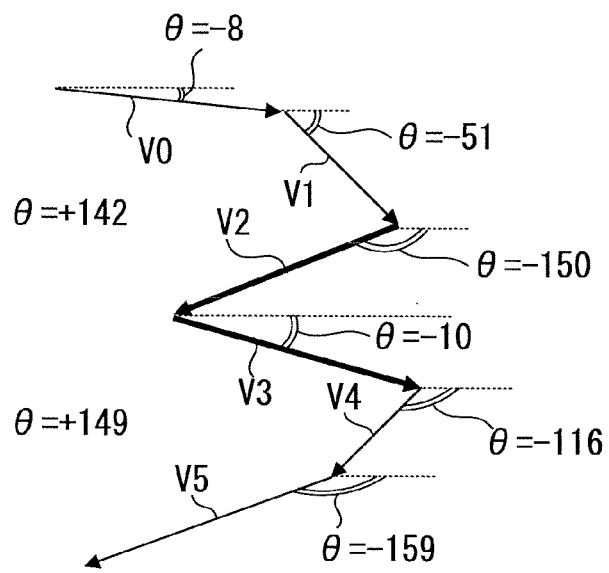

Meaning of this winding angle is shown in FIGS. 8A and 8B. This character of "S" shape forms ⊂ that opens to the left in anticlockwise at first and next it becomes clockwise and forms ⊃ that opens the left. Thus, "S" has a structure that is ⊂/⊃ or (⊂+⊃) in the symbol representation. Up to now, this has been called a quasi-phase features. Here, it is represented as the continuous quantity. It should be noted that vector of an end portion of ⊂ and vector of a start portion of ⊃ are overlapping.

A calculation method of the winding angle sequence is shown in FIG. 7. In FIG. 7, thick line indicates a convex portion in the anticlockwise left (a concave portion in the right). Thus, a "3" is simply represented with the winding angle sequence (+142, −140, +149).

Also, as for the handwritings "g" and "y" that make the discrimination of each other difficult previously and the recognition of the number "9", the easiness of the discrimination that used the winding angle sequence is shown. As for all three characters, the number of terms of the winding angle sequence is two. Those are represented with (Θ1, Θ2). Then, each character has a range of the winding angle as the following.

Handwriting "g"
Condition 1: −320<Θ1≦−190
Condition 2: 300<Θ2<400
Handwriting "y"
Condition 1: −170<Θ1<70
Condition 2: 300<Θ2<400
"9"
Condition 1: −500<Θ1<−150
Condition 2: 100<Θ2<250

Therefore, these three characters are able to be separated and recognized easily by constituting logic equations that are a condition 1 and condition 2. It should be noted that because these are immutable to rotation, actually a directional feature that corrects this is needed, but how it is easy will be understood.

Then, as a specific example, recognition processing about the most important Arabic numbers in the handwriting characters is explained. First, this "3" has structures: the clockwise, anticlockwise and finally clockwise as the rough structures; and (+, −, +) in the symbol, and the winding angle sequence (Θ1, Θ2, Θ3) which is formed with three winding angles Θ1, Θ2, Θ3 is formed. In a case of the numbers, besides, there is not the numbers that have this structure basically. Therefore, for example, if it is 90<Θ1<300 & −150<Θ2<−30 & 90<Θ3<300, as a template of "3", quite a lot transformation of this shape is able to be absorbed and the object is able to be recognized correctly.

Figure 10:
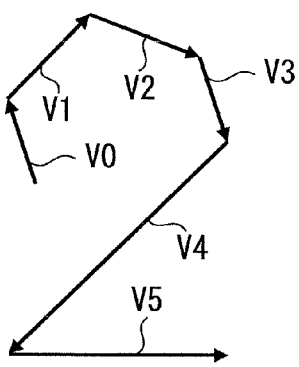
FIG. 10 is an explanatory drawing showing a length sequence according to an embodiment of the present invention.

It should be noted that the result that was approximated by the polygonal line segments obtains not only such a winding angle sequence but data of a length sequence. FIG. 10 is a drawing that illustrates the length sequence. Here, the length of whole polygonal line segments is assumed as 1.0 and a value in which the length of each polygonal line segment (vector) is normalized is obtained. Specifically, as shown in FIG. 10, assuming that vectors v0 to v5 are the approximated polygonal line segments, as shown in the lower side of FIG. 10, a whole length is assumed to be 1.0, and the length of each vector v0 to v5 is normalized and the set of each value is made to be the length sequence. In an example in FIG. 10, it is shown by the numerical value of two digits after the decimal point, as: length sequence: 0.12, 0.13, 0.13, 0.10, 0.30, 0.22. Sum of each length becomes 1, and it is understood that these are the normalized values.

Next, a principle in which the character recognition is performed by using the winding angle is explained. By using the winding angle, a recognition system that is strong for transformation though it is rough is able to be formed, but specifically various restricting conditions should be applied to these. Here, a most simple case in which the element of the winding angle sequence is one is good. This is presented by (+) or (−) symbolically.

(+): "1", "2", "3", "7", "9" and (−): "0", "1", "4", "6" are included respectively. Here, the "2", "3" and "4" having a loop are not standard forms of handwriting, but the transformed characters like this level must be recognized. As for the loop, it is described later. Also, "1" is put into both in consideration of the noise for safety. First, the numbers belonging to (+) are considered.

First simplest, it is to distinguish these with only the winding angle. Here, a "7" is simplified and the European & American style's "7" without a hook is recognized. Also, relating to this, "1" is made to be a standard form "|".

"1": $+0<|\Theta|<+30$

"2": $+280<\Theta<+600$

"3": $+400<\Theta<+700$

"7": $+90<\Theta<180$

"9": $+280<\Theta<+400$

From these, the "1" and "7" are able to be discriminated by only the winding angles. Also, the "3" can be discriminated, too.

However, a shape like as "α" that is an extreme transformation of "2" is excluded in the above condition (a shape like this "α" does not have a concave in the line segment that reaches an intersection of loop from a start point). In order to deal with such transformation, the analysis to be explained next is implemented, as for the loop portion.

Specifically, as for the characters "2", "3", "9" for recognition to which the consideration of the extreme transformation is necessary, if a plan in the analysis of these characters is explained, for example the winding angles of "1" and "7" do not exceed 30 degrees and 180 degrees respectively, more especially it means that those are gradual L type and U type respectively. Reversely, it shows that other characters exceed roughly half L+U, more specifically 45+180=225. Design may be done by numerical values intuitively, like this. However, loop may occur in the winding angles being 180+α precisely, but such abnormal loop where area is close to 0 may hardly occur in actuality.

Then, it is done so that the intersection-decomposition of the winding angles is carried out.

Figure 9A:
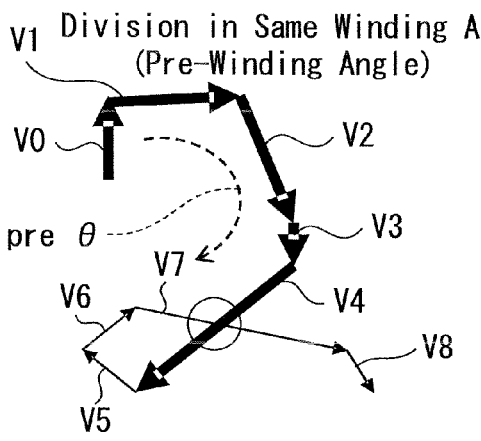
FIGS. 9A and 9B are explanatory drawings showing the division inside the same winding angle according to an embodiment of the present invention.
Figure 9B:
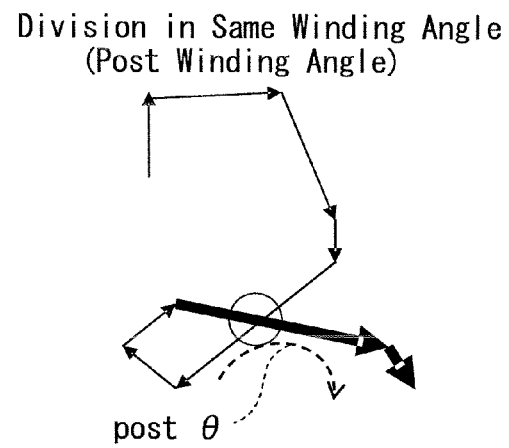

As the intersection-decomposition of the winding angles, here, separation of object characters "2", "3", "9" for recognition is considered. First, in the "2", as shown in FIG. 9A, winding angle becomes big too much on the upper portion of loop of "2", and the winding angle becomes about 600 degrees, as a whole of "2". Then, in order to solve such problem, division of the winding angles of the same sign is considered. It is that the winding angle of upper portion and lower portion and the winding angle of the loop are made to separate at the intersection of the loop. Specifically, in an example of FIG. 9, as shown in FIG. 9A, those are a winding angle (pre-winding angle: preΘ) from a vector v0 of a first polygonal line segment to a vector v4 of an intersecting polygonal line segment that enters to a loop and a winding angle (post-winding angle: postΘ) from a vector v7 of an intersecting polygonal line segment that exits out of the loop to a vector v8 of a last polygonal line segment, as shown in FIG. 9B. It should be noted that a winding angle formed by the vectors from v4 to v7 is omitted in here because there is not enough meaning in here, and is not used for the character recognition. If the winding angle of vectors from v7 to v8 is small, even if the pre-winding angle of vectors from v4 to v7 becomes big, both are distinguishable by making it below 90 for example, even if there is a case in which the winding angle as the whole overlaps with the "2" and "3".

The intersection-decomposition is performed at the loop formed point, like this, and for example, in a case of "2" and "3", an allowable range of the winding angle is determined as follows:

"2": $+280<\Theta<+450$- - - $>+300<\Theta<+700$ & $0\leq post\Theta<90$ & CROSS; and "3": $+400<\Theta<+700$- - - $>+400<\Theta<+700$ & $100\leq post\Theta$ & CROSS.

Here, the postΘ means the post-winding angle, in here. Also, naturally, it is assumed that both of "2" and "3" have an intersection (CROSS). The pre-winding angle is represented with preΘ. In addition, a refusal area is provided in between "2" and "3", in here. In addition, the intersection feature that is used here is described in the following.

Figure 11A:
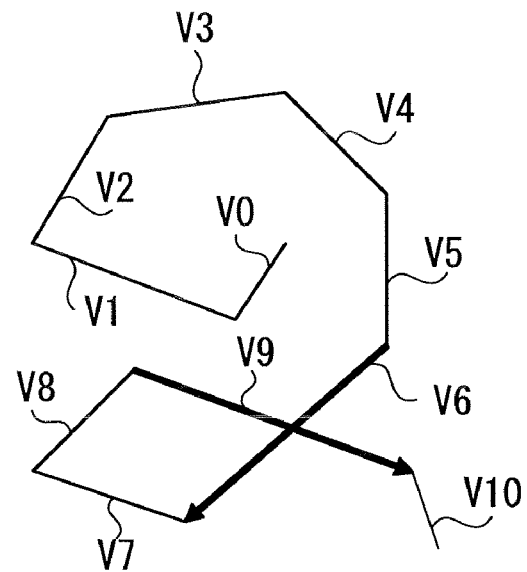
FIGS. 11A and 11B are explanatory drawings showing examples of winding angle according to an embodiment of the present invention.
Figure 11B:
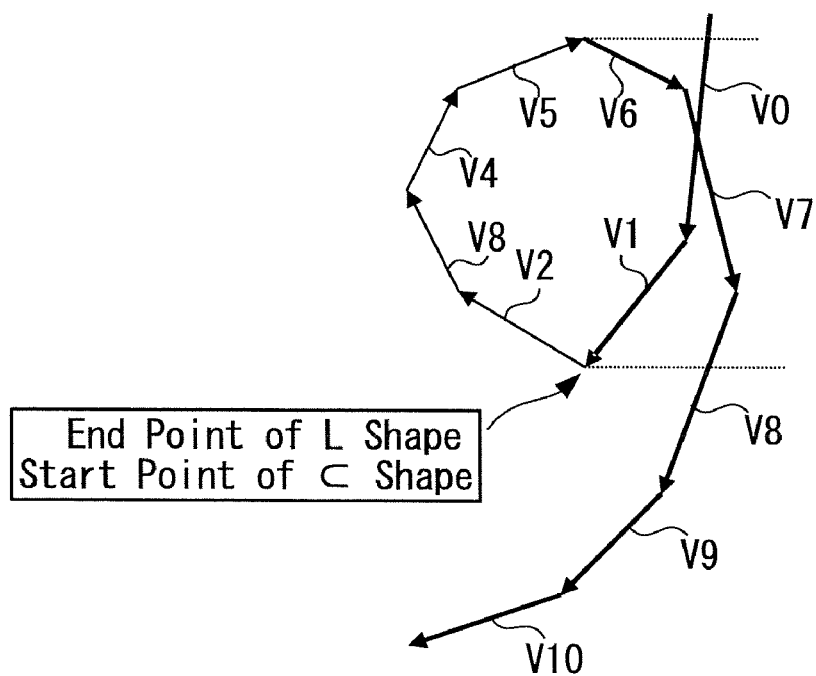

Next, as for the separation between the "2", "3" and the "9" of the object characters for recognition, it is apparent that the "9" overlaps with the "2", "3", if it is focused on only the winding angle. However, as mentioned above, there is a simple solution assumed that the "2", "3" have an intersection without fail and the "9" does not have it. However, it is not allowable, if the transformation of a free handwritten character is considered. The example is shown in FIG. 11. FIG. 11A is an example of the "2" and FIG. 11B is an example of the "9". An intersection occurs in either case, but it is able to be discriminated by the next condition. Specifically, as for the "9", the preΘ is small. It is 0 in this case. This is also the reason why the extreme transformation "α" of "2" was excluded previously. The pre-winding angle is 0 in this case.

"2": $+280<\Theta<=700$ & $0<post\Theta<90$ & $30\leq post\Theta$ & CROSS

"3": $+400<\Theta<700$ & $100\leq post\Theta$ & $30\leq post\Theta$ & CROSS

"9": $+300<\Theta<+400$ & {NO_CROSS|$0\leq post\Theta<$}

Next, the +− decomposition of the winding angle is explained.

In the example mentioned above, it is division in one winding angle, but corresponding to the winding angle sequence, it is divided into each partial length sequence and partial Δ sequence, and it is effective if a geometrical feature mentioned next is implemented to each portion. Then, processing that divides into the portion is described. This is an example of a character of "7" that has a curve. A length sequence, a Δ sequence and a winding sequence are the following. For this, an original figure (FIG. 13A), the Δ sequence of the figure that is approximated by using polygonal line segments and the winding angle sequence (FIG. 13B, FIG. 13C) are shown in FIG. 13. It should be noted that FIG. 12 (original figure: FIG. 12A, Δ sequence: FIG. 12B, winding angle sequence: FIG. 12C) shows an example of a character of "2", due to the comparison, and the comparison of FIG. 12 and FIG. 13 are described later.

Each sequence of the character of "7" shown in FIG. 13 is as follows:

Length sequence: 0.38, 0.17, 0.14, 0.32

Δ sequence: +121.29, −19.17, −19.72

Winding angle sequence: +121.29, −38.89

It is understood from the figure that Θ1 of first term of the winding angle sequence is formed by a first length sequence; 0.38, 0.17, and Θ2 of second term of the winding angle sequence is formed by the length sequence; 0.17, 0.14, 0.32. Here, a second polygonal line segment having the length of 0.17 belongs to both. This polygonal line segment portion is a branching line of sign of the Δ sequence. More specifically, this is a boundary line and an overlapping (common) portion. Like this, the length sequence and the Δ sequence are separated corresponding to +/− of the winding angle sequence, and it may analyze the structure with each. Examples of "7" having a curve and a mistakable "2" having a gently-sloping are shown in FIG. 12 for the comparison. Each sequence of the character of "7" shown in FIG. 12, is as follows:

Length sequence: 0.14, 0.09, 0.36, 0.21, 0.08, 0.12
Angle sequence: −2.05, −35.54, −113.31, −94.29, −47.49, −12.80
Δ sequence: +33.49, +77.77, −19.02, −46.80, −34.69
Winding angle sequence: +111.26, −100.51

In this case, the length sequence: 0.14, 0.09, 0.36, forms ⊖1 of first term of the winding angle sequence and the length sequence of second half: 0.36, 0.21, 0.08, 0.12, forms ⊖2 of second term of the winding angle sequence. Thus, a difference between both of "7" and "2" is apparent if the length sequence of second minus portion is observed. Aligning these, these are the length sequence: 0.17, 0.14, 0.32, of the second minus (−) portion of "7" and the length sequence: 0.36, 0.21, 0.08, 0.12 of the second minus (−) portion of "2", and in an ends-length ratio (length of start portion/length of end portion) that is mentioned later, the "7" versus "2" becomes the "0.53" versus "3.00", and it is understood that this feature is a key separating both. This is representing, as the numerical values, visual characteristics: the lower portion of "7" is lowering downward with almost straight line, but the lower portion of "2" is curving.

Figure 14:
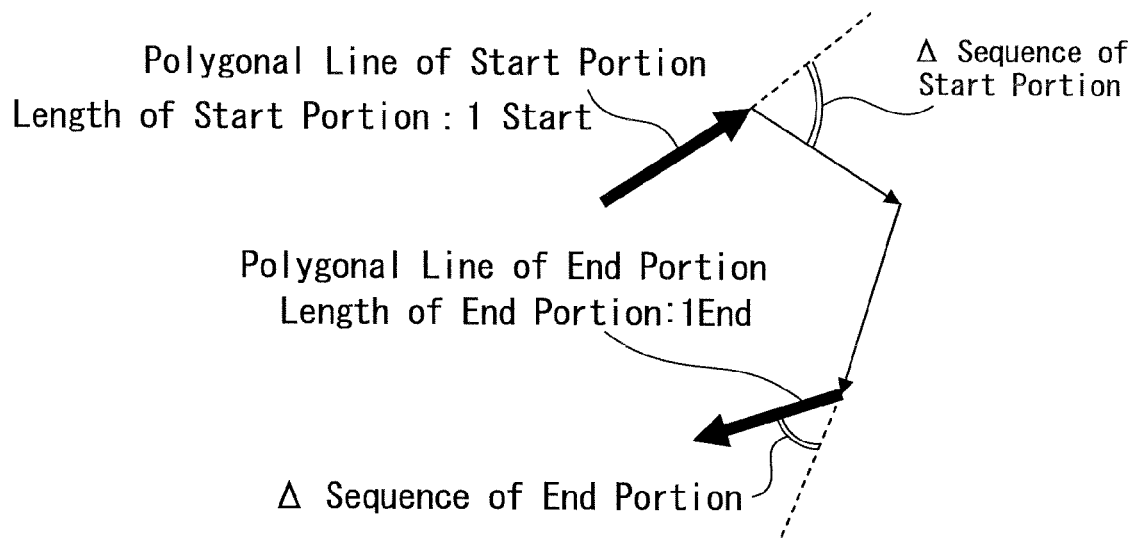
FIG. 14 is an explanatory drawing showing a start portion, an end portion and intermediates inside a winding angle according to an embodiment of the present invention.

It should be noted that, here, a definition about a start portion, end portion and intermediates at the winding angle in this embodiment are shown in FIG. 14. Assuming that one winding angle is formed with two or more polygonal line segments, as shown in FIG. 14, a length in which a polygonal line segment of start portion in two or more polygonal line segments is normalized is made to be a length of start portion, and the length of start portion is represented as "1 start". Also, a length in which a polygonal line segment of end portion is normalized is made to be a length of end portion, and the length of end portion is represented as "1 end". A start portion A value and an end portion A value are an exterior angle between adjacent lines that constitute the winding angle, as shown in FIG. 14. An intermediate polygonal line segment is each polygonal line segment which is between the polygonal line segment of start portion and the polygonal line segment of end portion.

Next, a geometric feature extraction is explained.

Considering various transformations of character, it is not sufficient with only these templates and these should be reinforced. A general guideline for that is mentioned. Up to now, a shape is prescribed by angle only, except for the distinction between the "7" and "2" having a curve. This is called the quasi-phase feature in the technical terms. However, actually in addition to this, the geometric feature is indispensable. A delicate combination of both of these is a shape of character. Especially, in this point, Arabic numbers have a system of really refined shape.

Therefore, first, polygonal line segment vertices coordinate sequence: (xs, ys), (x1, y1), (x2, y2), . . . (xe, ye) and polygonal line segment length sequence: (l1, l2, l3, . . . , ln) are determined. Typically, these elements are normalized with a whole length.

For example, in a case of an object character "1" for recognition, actually the polygonal line segment sequence is either a sequence: (l1), or a sequence: (l1, l2). As for the gradient, for example, the limitation in which an angle θ of a start point is in ±25° is needed.

Accordingly, the following features that are normalized are effective.

1. A ratio (ends-length ratio) of the length sequence ends-lengths: 1 start/1 end.
2. Maximum length of the length sequence ends: Max {1 start, 1 end)
3. The sum of intermediate lengths between the length sequence ends:

$$\sum_{n=2}^{n-end-1} 1n.$$

4. A maximum intermediate length (a maximum length within the intermediate lengths of the length sequence ends).

On the other hand, an angle or squarish feature is represented with MaxΔ of a maximum value of a Δ sequence, but the situation of the angle is fairly understandable with this value. To see a balance of the corner, it is represented with a ratio of the Δ value of ends or a Δ ends ratio, but it is fairly understandable by this value. As for the distinguishing of "U" and "V", it can guess which it is by only these two of information if these are written correctly. For example, if a maximum length of the length sequence ends is equal to or less than 0.6 and a value of sum of intermediate lengths between the length sequence ends is less than 0.2 and an ends-length ratio is larger than 0.8 and a Δ ends ratio is larger than 0.7, it may say that it is a clear "V".

Figure 15:
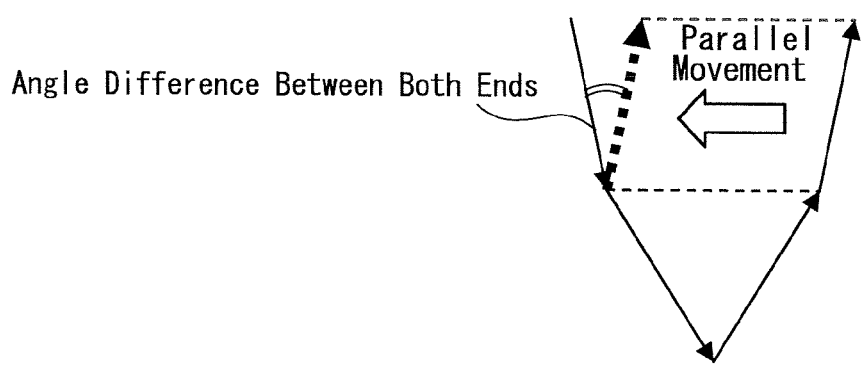
FIG. 15 is an explanatory drawing showing a difference of angle between both ends according to an embodiment of the present invention.

However, this is assumed that a winding angle of an object that is made to be a problem now is 90≦|Θ|<150. Hierarchization by this winding angle is very important scheme and it is mentioned about this, particularly. Also, the Judgment mentioned above is effective especially when the polygonal line segments are three. Furthermore, in the 150≦|Θ|<180 that is a next layer, the "U" and "V" coexist. In this case, a clearer feature is needed and if polygonal line segments of both ends of the "U" or "V" are considered and these are connected imaginatively and the Δ value between both is determined, this may be considered to be an angle of difference of an object character. This is called "both ends angle difference". The both ends angle difference is an angle between a polygonal line segment of start portion of a winding angle and a polygonal line segment of end portion, for example, as shown in FIG. 15. In FIG. 15, for explanation, parallel translation of the polygonal line segment of end portion is carried out and the both ends angle difference is shown.

For example, as mentioned above, using the features of the ends-length ratio and A ends ratio, and driving the object into "U" or "V", and seeing a value of the absolute value of both ends angle difference, and it is "U" if the value is equal or more than 155 degrees, and it is "V" if the value is less than 155 degrees. However, the "U" and "V" problem is not so easy. In the more subtle case, slightly high technique is necessary. It is mentioned later about this.

Summarizing the angle features mentioned above, these are:

1. MaxΔ;
2. Δ ends ratio; and
3. Both ends angle difference.

Next, an example of pre-processing is explained. Here, there is pre-processing 1 and pre-processing 2 in the pre-processing, and the pre-processing 1 is equal to processing in the step S14 in a flowchart of FIG. 2, for example, and the pre-processing 2 is equal to processing in the step S27 in a flowchart of FIG. 3, for example.

In order to extract the above features, if a suitable pre-processing is implemented to the length sequence and Δ sequence, it is very effective. Then, it is described below including noise processing.

Pre-Processing 1:

First, as for the noise processing, one is the processing that removes a very small point. This is not a normalized length and a suitable threshold is provided to an original physical length and point shaped noise is removed. Next, there is a case in which a small hook shaped extreme curve is caused at end portion of line, especially it is easy to occur in an online character. This extremely affects the winding angle mentioned before, thus removing this, and the Δ value generated as noise is subtracted from main winding angle. A threshold that is used in this time depends on a complexity of strokes. This noise processing is implemented at only both ends of a curve.

Pre-Processing 2

It starts from a length of start portion l(s) of a length sequence, and if a Δ(s) between l(s) and l(s+1) is less than 20, a l(2) is made to be equal to l(s)+l(s+1). Similarly, if a |Δ(s)| corresponding to l(1) and l(2) is less than 20, a l(2) is made to be equal to l(2)+l(3). If a condition of |Δ(i)|<20 is not satisfied, goes one step forward without doing anything. This is continued until l(e). Consequently, a new length sequence is obtained. A maximum problem, here, is a value of the threshold. On an experience, if it takes 10 as the threshold, there is almost no so-called side effect. It depends on the situation in a case of 20. The usage must be selected. It should be noted that it is mentioned later about a general feature extraction method to avoid this problem.

In the Δ sequence, it is good to implement to only a start portion and an end portion. Specifically, when l(s)=l(s)+l(s+1) or l(e)=l(e)+l(e−1) is implemented in a start portion and end portion of the length sequence, it is made as: Δ(s)=Δ(s)+Δ(s+1) or Δ(e)=Δ(e)+Δ(e−1), and this processing is not continued after that. Besides, for example, a long curved portion in the right sometimes curves subtly at "7". This is values of about 10 as the Δ value. However, the number of terms of the winding angle sequence increases by one, and the influence is big. Therefore, it is considered that the processing efficiency is improved by amending such Δ sequence, too.

It should be noted that as for this, actually the method of Ramer checks an error between a straight line and curved line as a maximum error length between both, therefore the noise processing of the whole curve is able to be done by adjusting this.

Next, filtering processing that is implemented in the embodiment is explained.

It is processing that extracts such patterns in advance before going into a full-scale recognition by checking an input characteristic that is understood easily. The approximated polygonal line segment representation is complicated at glance. The subsequent processing becomes easy if such patterns are extracted. Such processing is called the filtering processing, here. Specifically, there is processing that determines "a circle". It is explained with an embodiment. Here, in a case in which an unclosed curved line is written, it is an example that implements processing that considers that a circle is written from conditions of the curve.

Figure 16A:
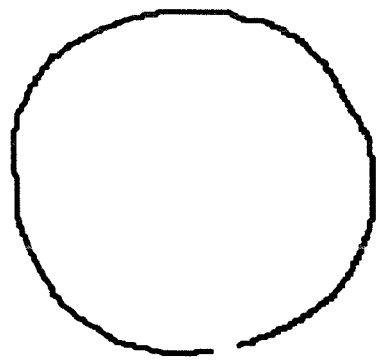
FIGS. 16A to 16C are explanatory drawings showing filter according to an embodiment of the present invention.
Figure 16B:
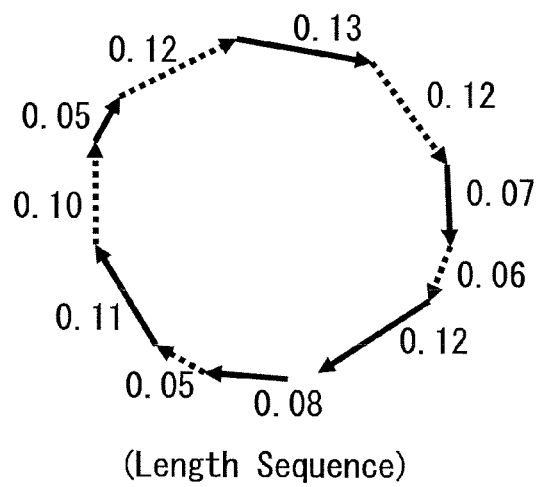
Figure 16C:
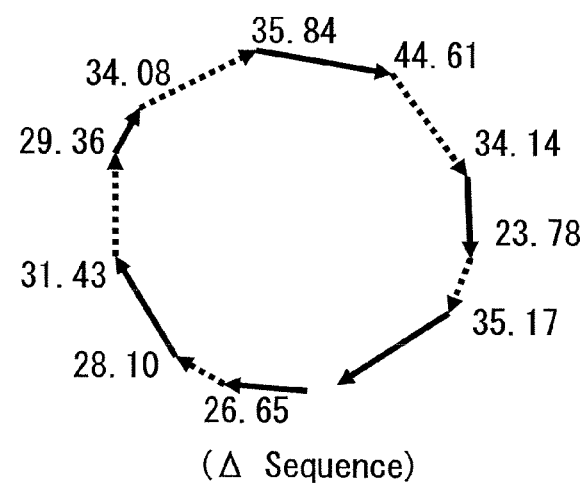

FIG. 16A is an original figure and polygonal approximation for this figure is shown in FIG. 16B. Normalized values of length sequence are put in FIG. 16B. FIG. 16C is a figure in which Δ values are put into the same polygonal line segments. The lengths and values may have similar values in a case in which a figure is close to a circle.

Therefore, in this case, the length sequence and A sequence becomes as follows:

Length sequence: 0.08, 0.05, 0.11, 0.10, 0.05, 0.12, 0.13, 0.12, 0.07, 0.06, 0.12

Δ sequence: +26.65, +28.10, +31.43, +29.36, +34.08, +35.84, +44.61, +34.14, +23.78, +35.17

The length sequence and A sequence in here are ones after noise processing or after pre-processing by a low threshold value, 10 for example. As for the filtering processing, primitive data is rather better than others. In here, it is recognized that the changes are small in the values of elements of the length sequence and A sequence. This is a feature of "a circle". In order to watch a uniformity of these elements easily, you may watch maximum values of the length sequence and A sequence.

In the length sequence, a maximum value is 0.13, and in the Δ sequence, a maximum value is 44.61. A winding angle is 14% of +323.16. In addition, standard deviation values of the length sequence and Δ sequence are σ(Len)=0.0292 and σ(Δ)=5.5714, respectively. Also, an aspect ratio (width/height) is 1.05.

On the other hand, as an example of sample that is seen as a circle at glance, those are:

Length sequence: 0.10, 0.11, 0.14, 0.05, 0.08, 0.06, 0.09, 0.13, 0.10, 0.09, 0.06;

Δ sequence: −28.25, −28.07, −25.85, −33.17, −33.19, −30.04, −35.81, −21.80, −23.20, −49.40; and Winding angle sequence: −308.78, Standard deviation values of the length sequence and A sequence are respectively:

σ(Len)=0.0272; and

σ(Δ)=7.4841, and

Aspect ratio (width/height)=0.71.

From this, the standard deviation values of the length sequence and A sequence and the aspect ratio are considered to be able to use as the feature quantities. However, like this example, the standard deviation values are not good for expectation, in fact. Actually, σ(Len) of the length sequence is 0.0272 and it is small in comparison with the first "a circle" sample, and σ(Δ)=7.4841 is rather big, and consequently the standard deviation values of two kinds are lacking balance. Also, the calculation quantity is big, too. The aspect ratio is able to be used only after having determined that there is roundness. A condition of this roundness is simple and good feature after establishment and it is used also in here. For example, it is divided into a hierarchy with the winding angle and conditions such as the following are made.

[1; (Maximum length≦0.15) & (Maximum Δ value≦46) & (Winding angle of top portion≦125) & (270≦|Winding angle|<300) & 0.80≦Aspect ratio (width/height)≦1.20]→"a weak circle 1"

[2; (Maximum length≦0.15) & (Maximum Δ value≦48) & (Winding angle of top portion≦130) & (300≦|Winding angle|<320) & 0.80≦Aspect ratio (width/height)≦1.20]→"a weak circle 2"

[3; (Maximum length≦0.15) & (Maximum Δ value≦50) & (Winding angle of top portion≦135) & (320≦|Winding angle|<360) & 0.80≦Aspect ratio (width/height)≦1.20]→"a weak circle 3"

Here, "a weak circle" without making "a circle" simply is a reason that it is difficult to write an accurate circle with handwriting, therefore "a weak circle 1", "a weak circle 2" and "a weak circle 3" that show the conditions which are near the circles, are defined by considering this and by setting up the above conditions. Thus, one that is able to be estimated to be approximately a circle satisfies this condition. A result to an input of FIG. 16 is [6-weak-o-3]. On the other hand, the example of the above is not determined as "a circle" finally by the aspect ratio.

Next, a cumulative angle feature function is explained.

The features mentioned above are easy to be affected by threshold. For example, as for Length sequence: 0.23, 0.28, 0.09, 0.14, 0.12, 0.14 and Δ sequence: +11.54, +73.01, +42.89, +7.37, +20.12, if the pre-processing is implemented with threshold of 20, a top portion is pre-processed because the Δ value is 11.54 and is smaller than 20, and a length of start portion becomes 0.51. However, an end portion is not pre-processed because the Δ value is 20.12 and is slightly larger than the threshold, and an ends length ratio becomes 0.14/0.51=0.27. By means of this, the ends length ratio & Max Δ accord with the condition that if these are (<0.5) & (>45), it is "L". In fact, this input character is obvious "V".

In order to solve this problem, a cumulative angle function to the length of Δ is considered from the length sequence and Δ sequence. The cumulative angle function to the polygonal approximation of the length sequence and Δ sequence is shown in FIG. 17. However, it includes a threshold problem at a step function (graph with dotted line). Then, a simple linear interpolation function is made. It is also shown in FIG. 17. It is the one that connects angle of each step by the line simply. The step function becomes a continuous function by the simple interpolation. Moreover, it is a monotonically increasing function. As for the interpolation function, it is necessary to make two kinds of forward direction and reverse direction. The length sequence and the A sequence that were used to each are shown in two tables. This is a reason that, in this simple interpolation method, the line of the interpolation is being the horizontal at last step when seeing a function's graph of FIG. 9 carefully. Specifically, in here, strictly, an inverse function cannot be uniquely determined. Certainly, as such thing does not occur, it is conceivable that a half of step in the step is employed and is interpolated, for example, but as for the performance, that two functions in the forward direction and reverse direction are used is more strict. Precisely, it is half at least if it is the length, it is almost reliably used in [0, 0.5]. In an actual application, it is used only to a half of a value area of argument, like this. As for the example of this "U", these two forward directional and reverse directional functions are accorded with because these are almost symmetrical. If one uses this, for example, especially it becomes a problem, in a problem or the like that distinguishes the "U" and "V", this inverse function, specifically a winding angle 90, is input and a length that is wound on that much is determined. It is shown in the graph and a length of X axis that gives 90° on a Y axis is determined. It is an example that uses the cumulative angle feature function reversely. The value on the X axis is given by taking down a perpendicular line to the X axis from a point where a horizontal line of 90° in the figure intersects the graph of the function (a solid line), and by a value of 0.448 on the point of the X axis. On the other hand, the reverse directional function is shown with a dotted line, and in this case, the length corresponding to 90° is also 0.448 and it accords with completely. This example is an example of "U" that is written so that it becomes symmetric as long as it is possible, and this result shows a goodness of the accuracy of this method.

This is showing that this figure is symmetry and simultaneously has a typical shape of U. For example, in case of "V", 90 length of start portion exceeds a central point and an overlapping with 90 length of end portion is caused. A ratio of these becomes 1.0 in case of "U" by that Min {90 length of start portion, 90 length of end portion} is divided by Max {90 length of start portion, 90 length of end}. This ratio is named as 90 degree length ratio. It should be noted that the above example is an actual example. As shown in this example, a fairly exact calculation is able to be done by a simple interpolation. Such calculation is able to be determined with optional α. Thereupon, generally it represents with a angle length (winding angle). Argument in here should not exceed a whole winding angle. A half of whole winding angle is chosen as argument if a global symmetry is desired to see.

On the other hand, this forward directional function, specifically it is possible to give a length and also to find out winding angles. Actually, this is a straightforward usage of the cumulative angle feature function explained earlier. For example, in a case in which a loop is opened and curved subtly in "6", it is able to be used effectively, but an input character "J" as an extreme example is considered specifically with referring to FIG. 18, in here. It should be noted that a shape of this character is a character of J without having a horizontal bar on the top. Here, as an example, a length as argument is assumed as 0.3.

In case of the example in FIG. 18, a forward directional function (unbroken line) and reverse directional function (dotted line) are greatly different. This reflects a shape of character "J" exactly. In this case, a winding angle in the forward direction, specifically at point forwarded by 0.3 from a start point, and reversely, a winding angle from the reverse directional function at point forwarded by 0.3 from an end point, are able to be determined similarly, and are 10.00° and 112.88° respectively, and that curves at both ends are extremely different is shown quantitatively by a ratio of both, λ length degree ratio (0.30)=0.09.

Here, an attention should be paid to this calculation that in an example of two polygonal line segments shown in the following, for example, if length sequences are 0.38, 0.62, and Δ sequence is +31.08, and when argument in a function of λ-length-degree exceeds 0.38, there is no corresponding term of the Δ sequence. In this case, results are brought as the followings.

λ length degree ratio (0.25)=0.61 (20.45) (12.53)
λ length degree ratio (0.30)=0.61 (24.54) (15.04)
λ length degree ratio (0.35)=0.61 (28.63) (17.55)
λ length degree ratio (0.45)=calculation error Actually, in a case in which number of polygonal line segments are two or three, this cumulative angle feature function may not be used, but an attention should be paid in a case in which number of polygonal line segments is small. Actually, there is no case that uses argument of this function of λ-length-degree exceeding 0.5. Also, a case in which this calculated error occurs may be checked easily. Experimentally, about 0.30 in argument is most effective.

It should be noted that the example shown in FIG. 17 and FIG. 18 is one example of linear interpolation and various other examples are considered, besides. This example is an example of case from a start portion, and the example may not be used in a case that sees this interpolation function from an end portion, and in this case it starts from an end with the same procedures and an interpolation function is determined newly. Thus, if these middles are taken, the interpolation function becomes a strong monotone increasing function (here, "strong" means the increasing, always) and is able to be used to both. However, this is not adopted in here.

Next, in order to distinguish similar characters such as "U" and "V", how to represent curve condition of the top becomes very important to implement extraction of geometric features. For a plan to solve this subject, in the embodiment, two methods that used winding angles: (1) balance due to midpoint detection, extraction of angle characteristic; and (2) curvature of top portion, are applicable. These two methods are explained hereinafter.

First, it is explained from the balance due to central point detection and the extraction of angle characteristic. This is a method such that winding angles becoming object are divided into two at a midpoint as a branching point and features are determined at each divided portion and those are generally evaluated and determination is made.

Here, "a midpoint" is α degree-length where a half of object winding angles is made to be α, in winding angles including a convex point or concave portion of an object character (find out from both sides of a start portion and end portion). This is able to be determined by the aforesaid cumulative angle feature function.

Specifically, "α° (winding angles/2); start point" that is a point wound with (winding angles/2) by measuring from a start point and "α° (winding angles/2); end point" that is a point wound with (winding angles/2) by measuring reversely are determined and a central point of analogue α° (winding angles/2) is determined. More specifically, a midpoint=((1−α° ((winding angles/2); end point))−(α° (winding angles/2); start point))/2+(α° (winding angles/2); start point), (this is a length that was normalized along polygonal line segments from the start point).

The midpoint obtained by the above calculation is analogue value, so a vertex of polygonal line segment nearest to the midpoint is made to be a branching point, for convenience, and a method which divides it into polygonal line segment groups at the front/back is taken. These polygonal line segment groups are named a front polygonal line segment group and a back polygonal line segment group. A total length of these partial lengths is determined, those are named a front total length and a back total length.

First, in order to extract angle characteristic of an object character, weighted average angles of the front polygonal line segment group and back polygonal line segment group are determined respectively. If a polygonal line segment sequence inside of the polygonal line segment group is l(1), l(2), . . . l(n) and an angle sequence is θ(1), θ(2), . . . θ(n) and a total length of front/back N=l(1)+l(2)+, . . . +l(n), weighted average angle is obtained as follows:

Weighted average angle=[*l*(1)×θ(1)+*l*(2)×θ(2)+ . . . *l*(*n*)×θ(*n*)]÷*N*

Angle between weighted average angles of front/back is given as follows, as both ends average narrow angle difference (=θsp).

θ*sp*=(θ(pre)+180)−θ(pro)

(θ(pre) is weighted average angle of front polygonal line segment group, θ(pro) is weighted average angle of back polygonal line segment group).

Also, as specific method seeing a linearity of the front polygonal line segment group and back polygonal line segment group, dispersion value of angles will be seen. More specifically, an angle dispersion value of front polygonal line segment group is, =[(θ(1)−θ(pre))²×1(1)+(θ2−θ(pre))²×1(2) . . . +(θ*n*−θ(pre))²×1(*n*)]÷*N*

(an angle dispersion value of back polygonal line segment group is the same). Dispersion value becomes large number, so this is divided by 100. There is no problem because comparison is a purpose even if it is done so.

It should be noted that there is an attention to be paid in a case of weighted average angle.

Figure 27:
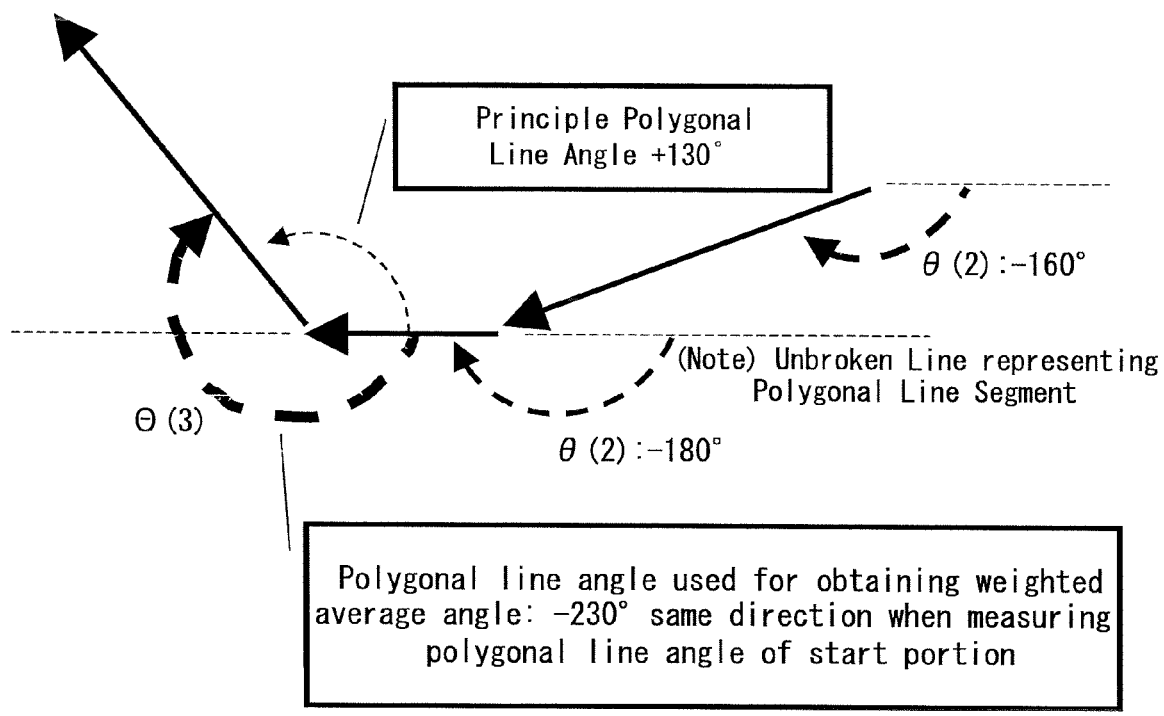
FIG. 27 is an explanatory drawing showing an example of calculation of a weighted average angle according to an embodiment of the present invention.

Value area of directional angle of polygonal line segment is −180≦θ≦180 and −180 shows the same angle as 180. This agreement is effective to represent the direction on two-dimensional plane of each polygonal line segment, but there is a case that causes problem when introducing such calculation obtaining these averages. More specifically, as shown in FIG. 27, even in a case that polygonal angle of a beginning of polygonal line segment group begins with minus, there is a case that a sign of an end becomes positive, so a suitable weighted average value may not be determined in that case. Therefore, here, a principle in a case of finding polygonal line segments is adjusted and polygonal angles are measured in the same direction as a sign of a start portion. It should be noted that this means that angles are measured on a Riemann plane mathematically. This plane is a surface in which a rift is put into a straight line from −∞ to the origin by a scissors and a surface in the third quadrant is extended downward in three-dimensional space and a surface in the second quadrant is extended upward and it is made to be a spiral shape.

Figure 28B:
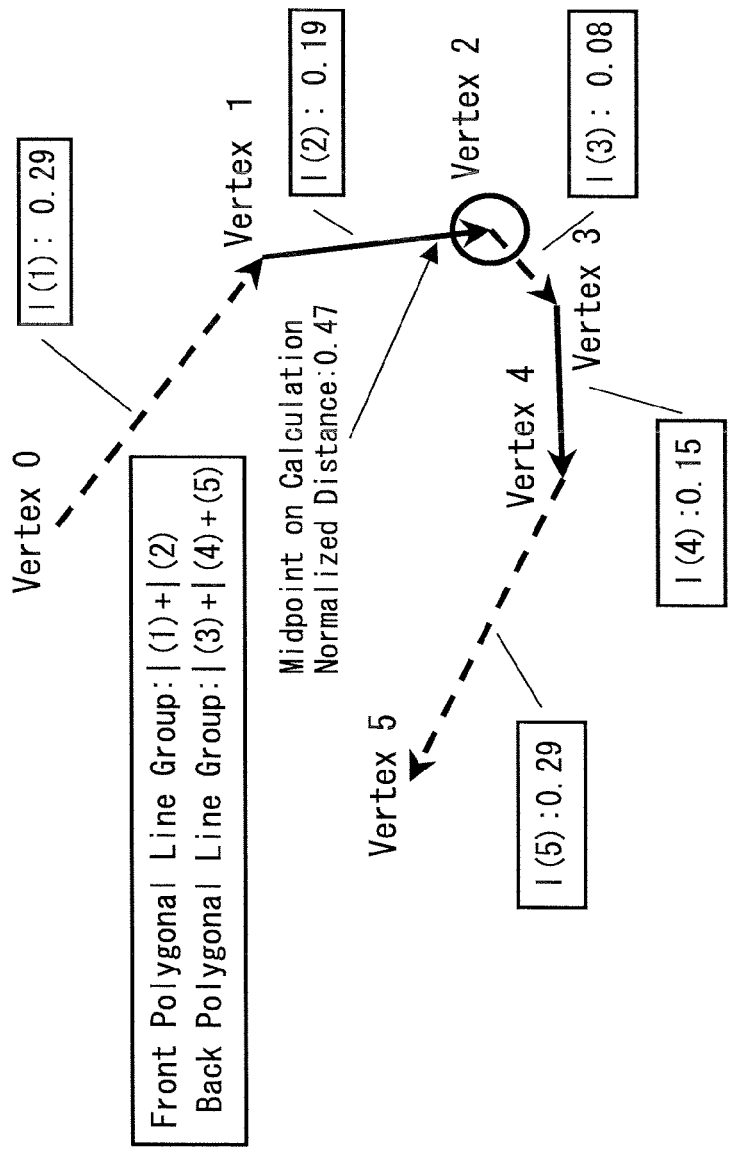
FIGS. 28A and 28B are explanatory drawings showing an example of detection of a midpoint according to an embodiment of the present invention.
Figure 28A:
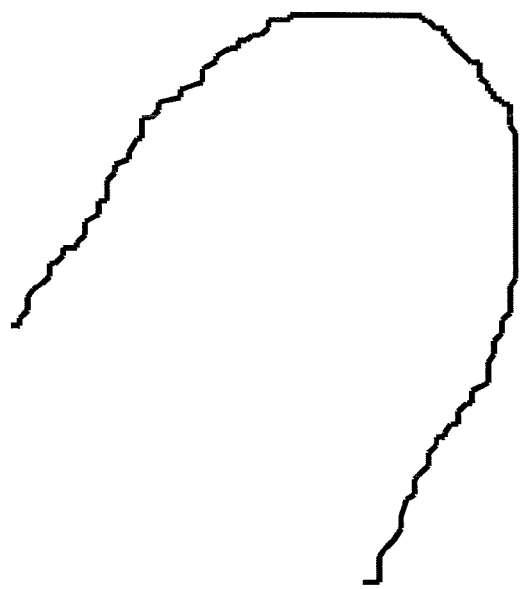

Next, balance of length of polygonal line segment group branched from a midpoint is defined as follows:
Definition of balance: Minimum (front total length, back total length)/Maximum (front total length, back total length). A specific example of geometric features of the above is shown below. First, a case in which an object character "U" in FIG. 28A is approximated by polygonal line segments, as shown in FIG. 28B, is explained. This representation is given as follows:
3: length sequence: 0.29 0.19 0.08 0.15 0.29 (192.81)
3: angle sequence: −35.68 −82.65 −140.71 −177.71 154.49
3: Δ sequence: 46.97 58.06 37.00 27.80
3: winding angle sequence: 169.84
3: vertex list: 0:(836, 47), 1:(875, 75), 2:(879, 106), 3:(868, 115) 4: (843, 116), 5: (799, 95)
Midpoint=((1−0.47)−0.41)/2+0.41=0.47
(It is understood that it is a point between vertex (1) and vertex (2) from length sequence)
Distance to vertex (2): 0.48−0.47=0.01 (using length sequence)
Distance to vertex (1): 0.47−0.29=0.18 (same as the above)
Therefore, nearest vertex to midpoint: 2: (879, 106) is selected as a branching point.
Front weighted average angle: −54.27
Back weighted average angle: −187.3
Narrow angle θsp between straight line of front weighted average angle and straight line of back weighted average angle is: θsp=(θ(pre)+180)−θ(pro)=(−54.27+180)−(−187.3)=313.0, but this is out of the value area of directional angle, so it is subtracted from 360, then it becomes 47° and it is understood that it is considerably open.

Linearity of front polygonal line segment group and back polygonal line segment group are able to be seen by front angle dispersion and back angle dispersion, respectively. Those are given as follows:
Front angle dispersion: 253.25/0.48/100=5.27
Back angle dispersion: 280.4/0.52/100=5.39
Balance of length of front polygonal line segment group and back polygonal line segment group is given by balance: Min (front total length, back total length)/Max (front total length, back total length)=0.48/0.52=0.92.

On the other hand, an example of "V" is shown in FIG. 29A and FIG. 29B.
Length sequence: 0.34 0.14 0.13 0.39 (205.98)
Angle sequence: −56.06 −79.11 170.13 152.02
Δ sequence: 23.06 110.75 18.11
Winding angle: 151.92

Vertex list: 0:(660, 41), 1: (695, 93), 2: (700, 119), 3: (677, 115), 4:(613, 81)
Midpoint: 0.47
Vertex: 2
  Front weighted average angle: −62.78
  Back weighted average angle: 156.54
  Front angle dispersion: 1.09
  Back angle dispersion: 0.61
  θsp=39.32
  Balance: 0.92

Comparing angle characteristic and balance by midpoint detection of the above "U" and "V", these are, θsp:47° vs 39°, front angle dispersion + back angle dispersion: 10.66 vs 1.70, balance: 0.92 vs 0.92. Especially in dispersion, it is understood that there is clear difference. By seeing difference by this dispersion, it is able to correspond to considerable transformation with a few masks. On the other hand, there is no difference in the balance. This is because both are symmetry. This value changes and it becomes one stroke of "J" if balance becomes about 0.5, for example.

It should be noted that a method in which this midpoint is determined and a curve is divided is not limited to one winding angle figure that is alone. Generally, similar processing is possible within curve of each term of winding angle sequence. For example, difference between "2" and "z" are able to be assumed as "2"=("∩"+" ⊃ ")+" ⊂ ." and "z"=" ⊃ "+" ⊂ ", difference between "W" and "ω", which are written with one stroke, are able to be assumed as "w"="V"+"V" and "ω"="U"+"U", so a midpoint is determined in each winding angle area and the above processing is able to be implemented.

Also, a midpoint becomes the same as an inflection point in the differentiation in case of a character written correctly. Thus, this is able to be used. However, midpoint in the above is more general. Also, a midpoint may be easily determined as a point of normalized distance 0.5 from both ends, but this is only effective to symmetric figure.

Next, a curvature of a top portion is explained.

This is a feature in order to distinguish both by seeing curves at top portions of "U" and "V". This is explained by using an example shown in FIG. 19. FIG. 19A is an original figure of "U" and an example that approximated by polygonal line segments together with length sequence are shown in FIG. 19C. FIG. 19B is an original figure of "V" and an example that approximated by polygonal line segments together with length sequence are shown in FIG. 19D.

First, winding angle of top portion is determined. In an example of "V" shown below, winding angle with length of 0.3 from both ends is known, from λ length degree ratio (0.30)=0.59(11.63) (6.90), more specifically, 11.63 is winding angle from a start portion to 0.3 and 6.90 is winding angle from an end portion to 0.3. Then, this sum 11.63+6.90=18.53 is subtracted from a whole winding angle of this character. More specifically, it becomes 124.98−18.53=106.45.

This is a winding angle of top portion. by referring an example of under this is divided by 0.03 of length of top portion, then curved condition of this top portion (like a curvature) is obtained. The length is divided after multiplying 100 times, for convenience. Therefore, it becomes 106.45/3=35.48.

If this is high, it is determined as "V", and if it is low, it is determined as "U". Here, the length is 1.00−2×0.30=0.4 in an interpolated cumulative angle feature function, but this may be used when length of top portion is obtained clearly in the pre-processing. However, it is generally 0.4, so this value is common to samples. Therefore, a curvature of top portion is able to be evaluated by only winding angle of top portion, but that curvature is determined as mentioned above by taking a sum of intermediate length is effective. The similar calculation is implemented in an example of a case of "U". In this case, length of top portion becomes 0.09+10.12+0.11+0.09=0.41 from length sequence after pre-processing (threshold 20). Comparing with curvature 35.48 and angle (106.45) of top portion of V and those values of U, sharpness of top portion is clearly represented as numerical values.

Example: In case of "V": Curvature of top portion (angle): 35.48, (106.45)
Length sequence: 0.41, 0.10, 0.03, 0.10, 0.37
Winding angle sequence: +124.98
Length sequence before/after processing (threshold 20):0.51, 0.03, 0.47
Parameter:
  A length degree ratio (0.30)=0.59 (11.63)(6.90)
Curvature of top portion (0.30)=35.48 (winding angle of top portion=106.45)

Example: In case of "U": Curvature of top portion (angle): 2.16, (88.68)
Length sequence: 0.27, 0.09, 0.12, 0.11, 0.09, 0.32
winding angle sequence: −172.23
Length sequence before/after processing (threshold 20): 0.27, 0.09, 0.12, 0.11, 0.09, 0.32
Parameter:
  A length degree ratio (0.30)=0.84 (45.49)(38.06)
Curvature of top portion (0.30)=2.16 (winding angle of top portion=88.68)

In General, this cumulative angle feature function is a monotone function, and is very simple in comparison with other functions, in such meanings A part of two-dimensional figure, specifically in a case in which the number of items in winding angle sequence is one, is layered, but it is very interesting that it is represented by a simple monotone function. If this monotone function is linear, a shape is approaching continuously to "arc", "half circle", "circle" and finally to "circle" with winding angle 360°, according to winding angle. If it is an unit function and leading edge point is close to a central portion, also a shape becomes a wedge shape with 180° from "V" opened according to winding angle. Also, it becomes a check shape while deviating from a center. Also, it becomes U shape from V shape while the leading edge becomes loose in the vicinity of a center. It becomes J shape if it deviates from a center. A figure model may be formed mathematically, like this. Also, if a linear interpolation is approximated by polynomial equation, for example is approximated by third order spline function, the differentiation up to the second-order becomes possible and a cumulative angle feature function may be analyzed more. For example, a triangle with a obtuse angle has two second-order differential peaks. A curvature is also able to be calculated and calculation of exact delicate characteristic becomes possible. Such thought is also useful to form an abstract figure map. In a case that the number of items in the winding angle sequence is two, a space of cumulative angle feature function becomes section of the product of two cumulative angle feature functions. It is similar subsequently. Consequently, a complex figure is represented briefly by combination of this monotone function.

Next, a method in which a target character is decomposed to two or more portions by using pattern of change of adjacent polygonal line segment angles or cumulative angle feature function of a polygonal line segment angle sequence and the portions or boundary points are used for comparison with an object character for recognition, is explained.

First, as a specific case, consider changes in "1"→"L"→"U"→"0"→"6". In case of representing with winding angle quantitatively, these are "1=0"="L=90"→"U=180"→"0=270"→"6=360". However, interior structure is not reflected in this. On the other hand, it is possible to represent these interior structures by symbol as: "1=|"→"L=L"→"U=U"→"0=⊂+U+⊃"→"6=⊂+U+⊃+∩".

Figure 33:
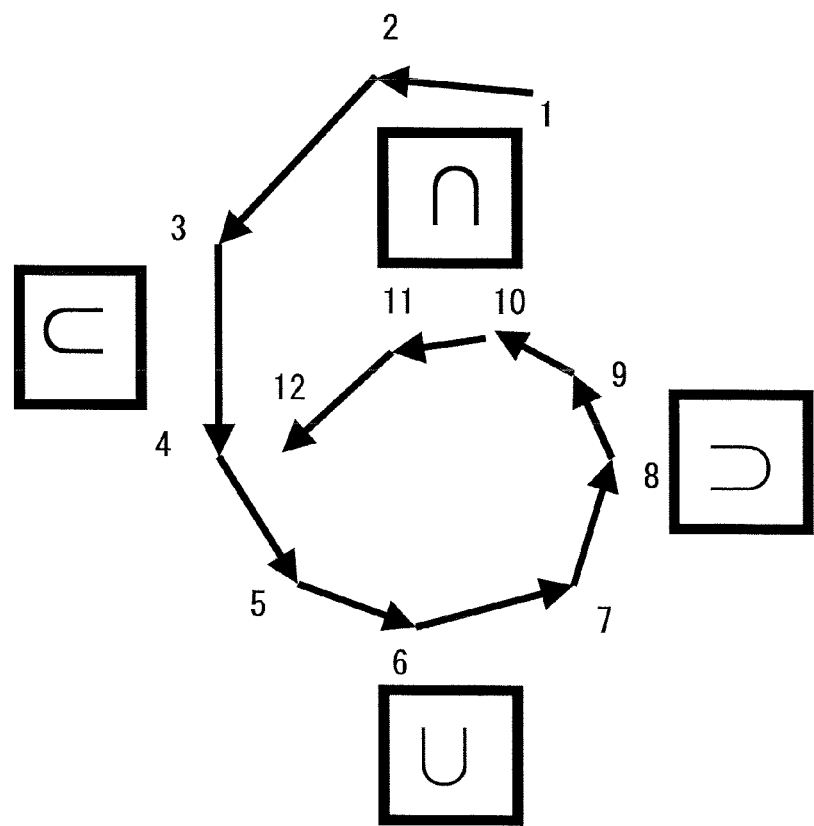
FIGS. 33, 33A and 33B are explanatory drawings that illustrate division/inflection point according to an embodiment of the present invention.

"6" of FIG. 33 is used as an example. First, boundary points (concave inflection point and convex inflection point) are detected (point 3, point 6 and point 8 correspond). The "6" in FIG. 33 is divided into the following portions by start point, end point and these boundary points.

portion from start point 1 to point 6: "⊂ shape" portion
portion from point 3 to point 8: "U shape" portion
portion from point 6 to point 10: "⊃ shape" portion
portion from point 8 to end point 12: "∩ shape" portion The discrimination of "1", "L", "U" and "6" becomes possible by dividing an object character and by causing each portion to correspond with symbol representation, like this.

Figure 33A:
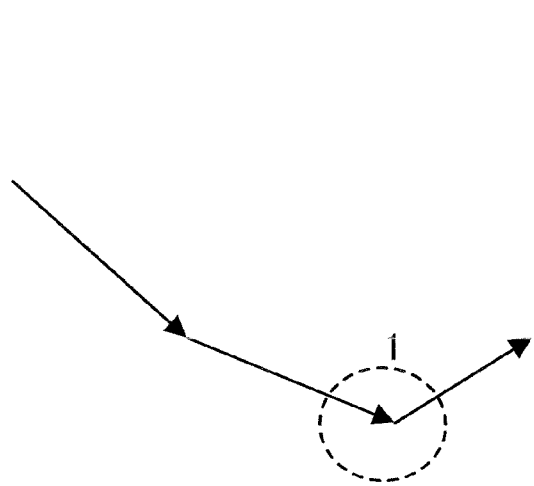
Figure 33B:
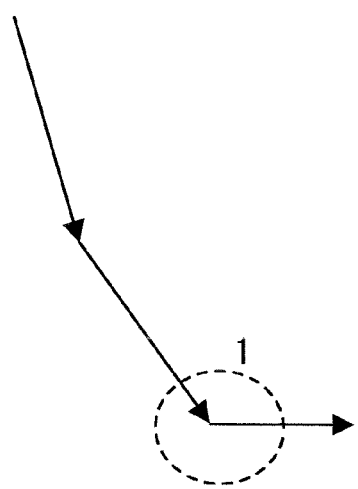

It should be noted that boundary point in the above example is in accord with so-called differential concave/convex inflection point in typical X-Y coordinate system, but more typically a rotation needs to be considered. For example, as shown in FIG. 33A, point 1 is a differential concave inflection point in the typical X-Y coordinate system, but the same point 1 is not a differential concave inflection point if it makes a shape of FIG. 33B that was rotated. In order to respond to such rotation, a cumulative angle feature function is used and boundary point needs to be determined generally. For example, a vertex close to a degree length (90) in case of "L shape" or a vertex close to a degree length (180) in case of U shape is detected as boundary point and division is implemented. This situation corresponds to obtaining a midpoint generally.

Next, a method in which curve of each stroke is divided according to winding angle sequence and local feature and quasi-local feature are determined in each curved portion divided and an object is represented hierarchically and divisionally, is explained.

Figure 34:
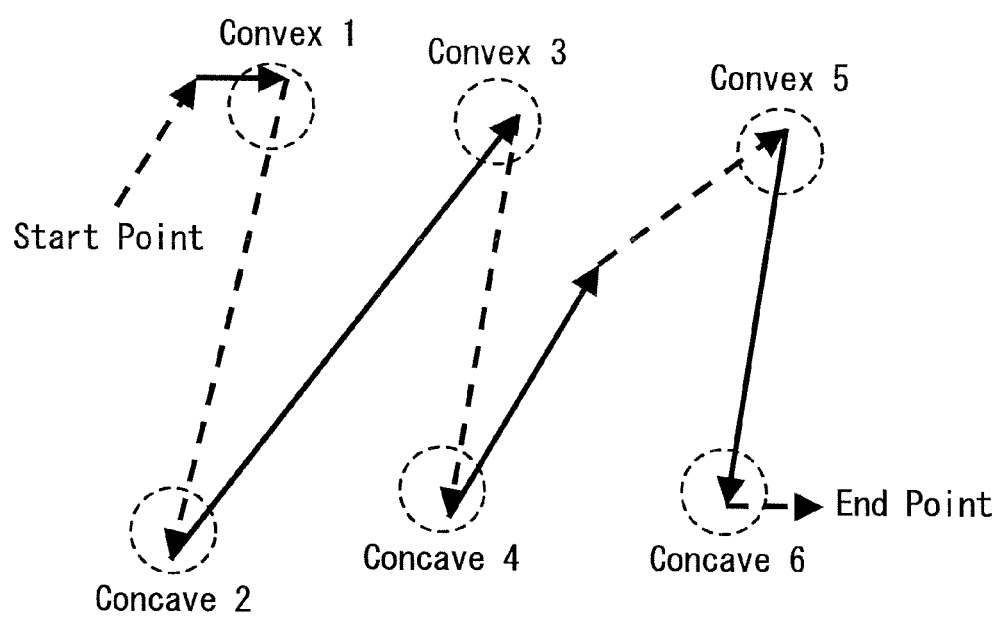
FIG. 34 is an explanatory drawing that illustrates a frame structure according to an embodiment of the present invention.

As a specific case, "m" is first considered. The number of winding angles of "m" in FIG. 34 is 6. This is represented symbolically as ∩+V+∩+V+∩+L. Item number is assigned from left to each winding angle area of winning angle sequence and inflection point feature (concave inflection point or convex inflection point) in each winding angle area is determined, then number such as convex 1 (convex inflection point belonging to a first winding angle) or concave 2 (concave inflection point belonging to a second winding angle) is assigned to those. Relationship among these concave/convex inflection point, start point and end point is called "vertex arrangement". "Frame structure" that means a framework of object character is defined by this vertex arrangement.

For example, in case of this "m", height of each point of a start point, convex 1, convex 3 and convex 5 aligns almost and also each point of a concave 2, concave 4, concave 6 and end point is even almost to height of bottom. Frame structure of "m" is defined by such feature of vertex arrangement. Difference of feature of this frame structure is apparent by comparing with "h" of FIG. 35A and "n" of FIG. 35B. Alternatively, in attention to not only height of object character but also width, there is a method in which positional relation among each convex point or among each concave point is defined and ratio of length and breadth is defined.

Figure 36A:
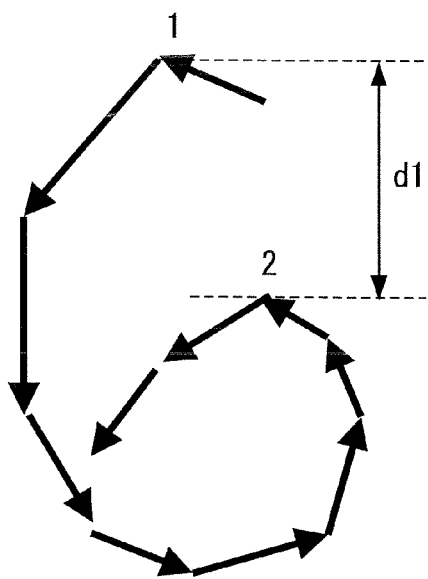
FIGS. 36A, 36B, 36C and 36D are explanatory drawings that illustrate frame structure according to an embodiment of the present invention.
Figure 36B:
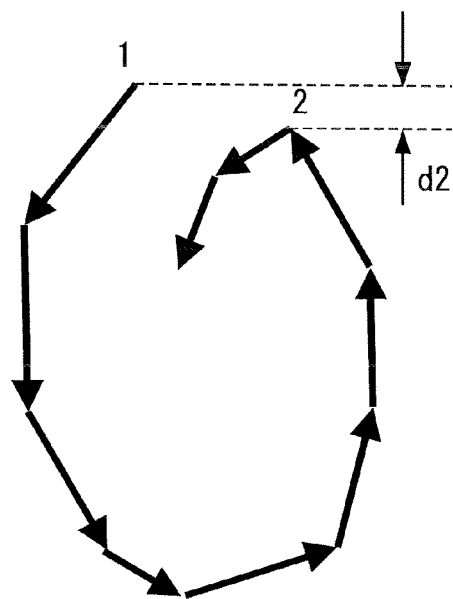
Figure 36C:
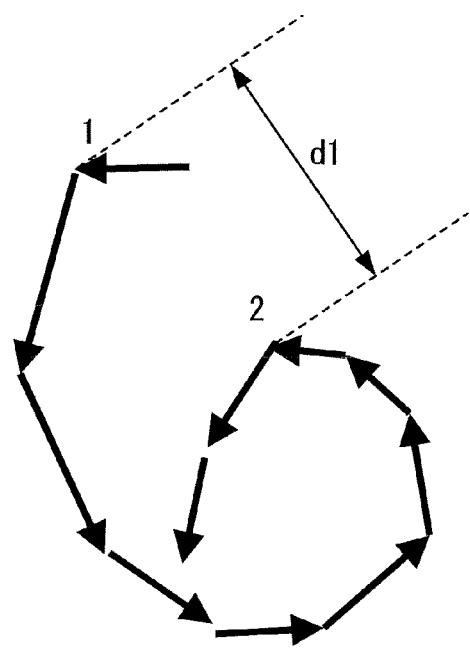
Figure 36D:
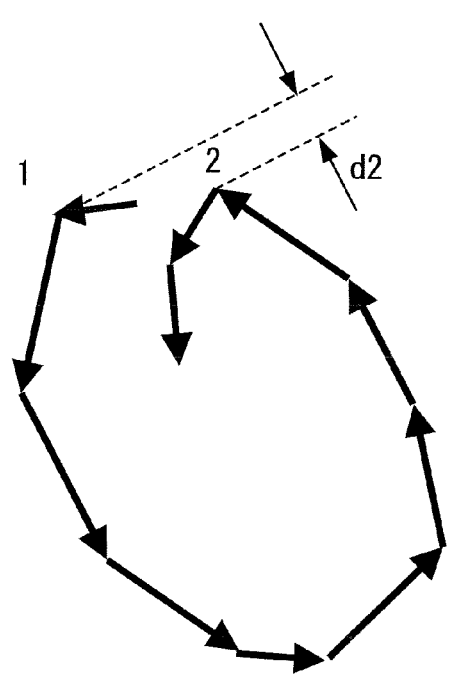

Also, for example, even in case of "6" as shown in FIG. 36A and "0" as shown in FIG. 36B, specifically both are ⊂+U+⊃+∩ structure, both are able to be discriminated effectively by using frame structure. The discrimination between "6" and "0" becomes possible by seeing distance (d1, d2) between boundary points (point 1, point 2). Even in such case, by using a detection method of general boundary point (inflection point) that used a cumulative angle feature function, it may be applied to an object rotated optionally such as "6" as shown in FIG. 36C and "0" as shown in FIG. 36D.

Also, as an example in which a local feature in each curved portion divided is determined and an object is represented hierarchically and divisionally, a minimum A value in winding angle area 2 and winding angle area 4 of the above "m" is raised. This shows a sharp wedge shaped sharpness that exists between ∩∩ of "m", quantitatively. A minimum Δ (winding angle area 2) value and minimum Δ (winding angle area 4) value are features that become keys. It should be noted that a reflected image in X axis of "m" is "W" and a frame structure is the same, but a minimum Δ (winding angle area 2) value and minimum Δ (winding angle area 4) value are cancelled and not the features that become keys already, and consequently a maximum A value of winding angle area 3 becomes a key.

A little complicated shape is also divided by a winding angle sequence, like this, and an object is represented hierarchically and divisionally by those local and quasi-local features. Also, a so-called quasi-phase symbol representation such as m: ∩V∩V∩L as mentioned before, is represented continuously, and is able to have a representation that changes continuously to one transformation of "W" such as W: UΛU-ΛUΓ.

Next, it is explained about rotation problem. Basically the present system is immutable to rotation, but a regularly written character is not immutable to rotation. Therefore, angle of imaginary line segment that becomes an axis of character needs to be prescribed. For example, a weighted average angle mentioned up to now plays this role. The recognition of an object is made to be possible for the change of rotation of about ±45° by taking this angle range widely.

Next, a figure element map shown in a flow chart of FIG. 4 is explained.

This is prepared to construct a reading system without misreading by capturing character and figure general as a whole, without supposing only a particular character set, for example, Arabic number, English capital letter. Specifically, pattern of figure general is layered by winding angle, and is divided by the features mentioned above at each layer. Accordingly, shapes that have any meanings without exception at each layer or that have features are fully covered and listed. Abnormal shape is also included because there is no exception. Figures in here do not relate to rotation or size. Therefore, it becomes META element figure, from a standpoint of character.

Figure 20:
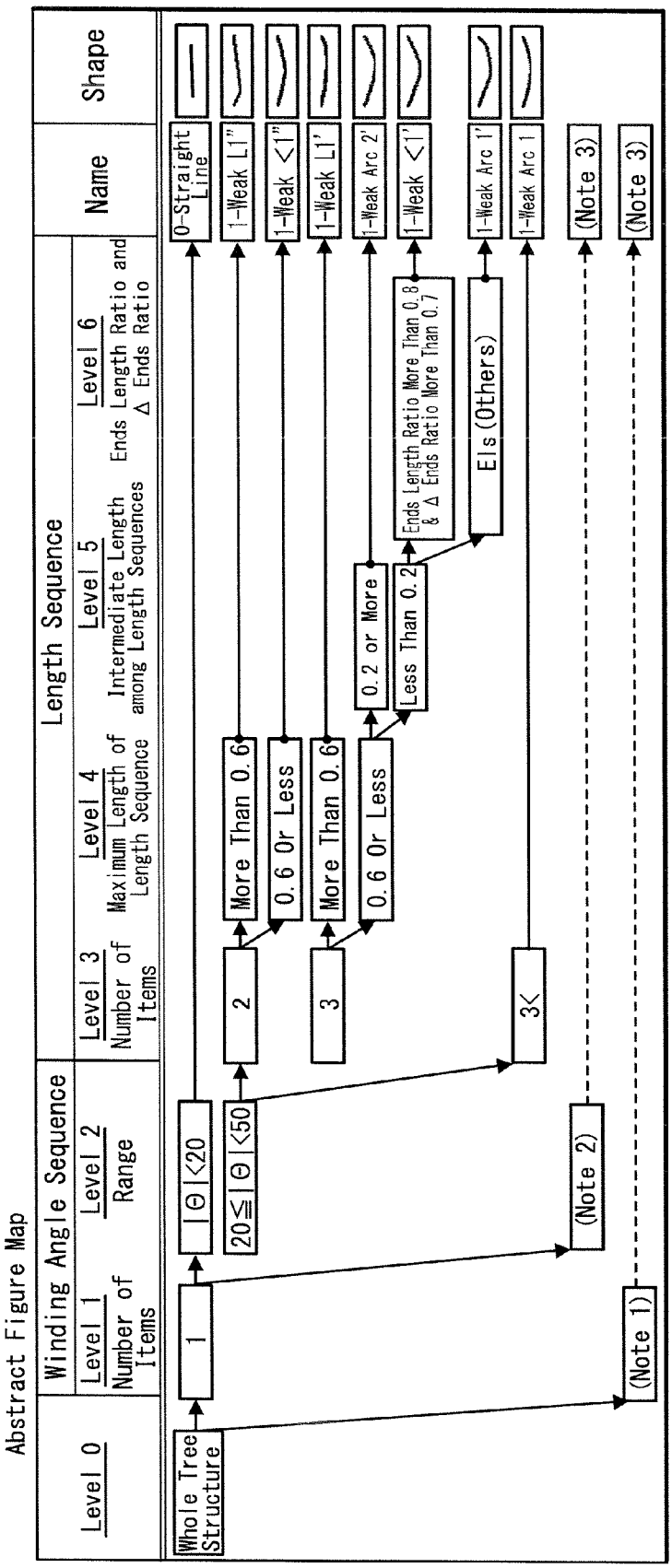
FIG. 20 is an explanatory drawing showing an example of abstract figure map according to an embodiment of the present invention.

A whole structure of this figure element map becomes a tree structure that is a typical layered structure as shown in FIG. 20. This map is obtained, because features are very simple as mentioned above. It is classified with winding angle sequence item number at root level-0 at first and next, at level-2, in here, as a foundational figure, a case in which it is a largest and winding angle sequence item number that becomes foundation is 1 is described in detail. In level 2, angle node is formed within winding angle.

Node 1, $|\Theta|<20$,
Node 2, $20 \leqq |\Theta| < 50$,
Node 3, $50 \leqq |\Theta| < 90$,
Node 4, $90 \leqq |\Theta| < 180$,
Node 5, $180 \leqq |\Theta| < 270$,
Node 6, $270 \leqq |\Theta| < 360$,
Node 7, $360 \leqq |\Theta|$ In this partial tree, a simplest is node 1, |Θ|<20, and figure that enters into this is "straight line". There are "1", "→", "/" and "\" as character and symbol. Because it is immutable for rotation in here, these are not distinguished and are represented by META element figure named as "straight line". This layer is made to be 0 layer. It is represented as "0-straight line".

Next layer is node 2, 20≦|Θ|<50. Others, this classification is explained in detail in FIG. 20. Like this, this layer 1 includes seven element figures of "1-weak L1", "1-weak L2'", "1-weak<1'", "1-weak<2'", "1-weak arc 1", "1-weak arc 2'" and "1-weak arc 3'". Then, there is no other figure. This is all.

Only a few things correspond to actual characters and symbols in this layer, but for example, the "1-weak L1''" is an existing "-". Also, these are frequently appeared actually instead of "1", "→", "/" and "\"

Each layer is created as described above, and a figure as a result thereof is shown in FIG. 21. FIG. 21 shows examples of layer 0, layer 1, layer 2, layer 3 and layer 4. Figures of each layer are not limited to this example.

Next, a positional relationship between two or more strokes is explained.

Hereinbefore, only character of one stroke is treated, but character formed with two or more strokes is considered in here.

Here, if concept of abstract figure is utilized, character of plural strokes is able to be recognized very easily through object figure, as shown in the following example. Moreover, it is immutable for rotation perfectly. Abstract figure is formed with winding angle lower than 700° so as to give an answer to almost all transformations. Especially, "arc" is effective. A weak arc is able to be treated as a straight line. On the other hand, if the winding angle becomes large, relationship becomes more simple because independency is high. For example, if an object figure formed with two strokes is recognized as "straight line" and "3" respectively, this connection is "B" uniquely. Of course, there is a case that needs a detailed positional relationship such as "D" or "P", and those should be determined. Those are explained, below. Here, the above is explained by using an example.

Figure 22:
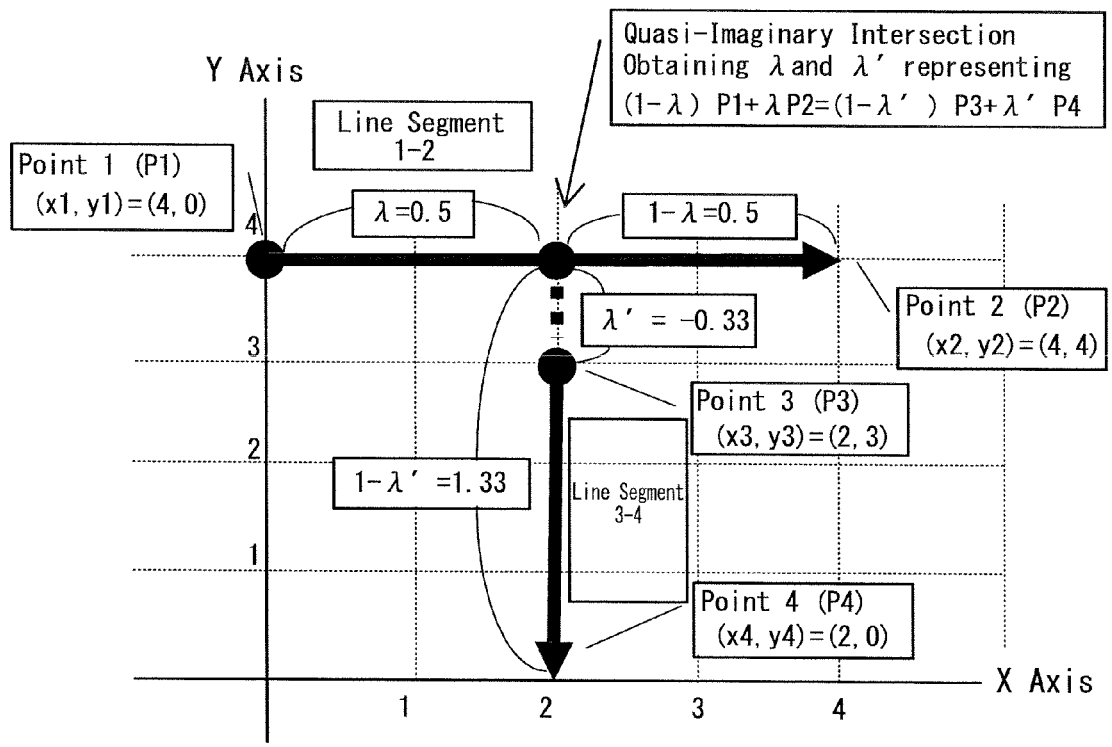
FIG. 22 is an explanatory drawing showing an example of quasi-imaginary intersection according to an embodiment of the present invention.

An example below, as shown in FIG. 22, is a "H" which is written by curving a vertical line, and which is recognized as arc, straight line and arc. It is already supposed that it is "H", from these only. As for positional relationship, if it is performed on the basis of the recognized result, it is very good efficiency.

1: Result: "weak arc 3"
2: Result: "straight line"
3: Result: "strong arc 3"

Thus, it is understood that for example, in normal manner of writing, first stroke and third stroke are written from top to bottom in approximately vertical and second stroke is written from right to left, from brush-stroke information of a stroke. Then, it is easily supposed that a written character is "H" by only independent information of each stroke. Then, next step is to know quantitative positional relationship of these three strokes.

Then, that it is considered is a concept of general intersection and the derivation method.

Figure 23:
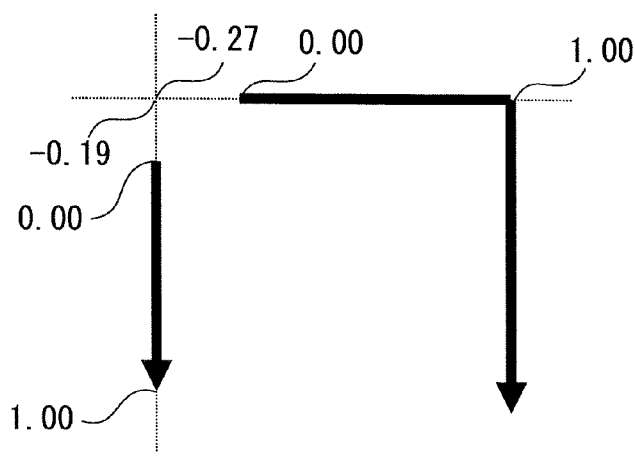
FIG. 23 is an explanatory drawing showing an example of imaginary intersection according to an embodiment of the present invention.
Figure 24:
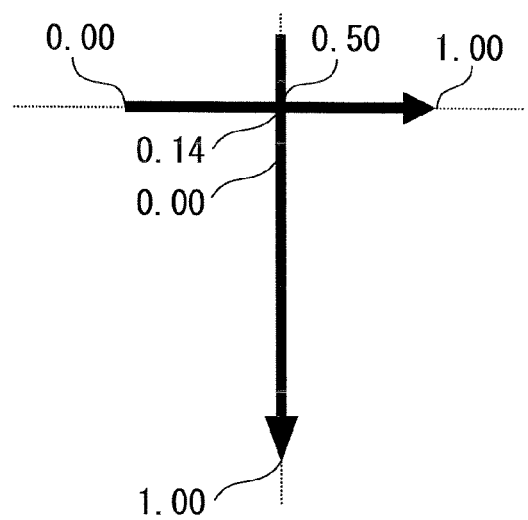
FIG. 24 is an explanatory drawing showing an example of a real intersection according to an embodiment of the present invention.

First, the thought is explained. IN FIG. 22, character "H" is shown, but this horizontal line is at both sides of this horizontal line in this case, and is not intersecting/contacting with vertical line. However, these three strokes clearly constitute character "H". It is because a vertical line exists on a extension of this horizontal line and moreover at a short distance. In such case, a distance between an edge point and vertical line is able to be determined by a well known analytical geometric equation. However, it is complex. That this is determined as a point of intersection and as an extension of horizontal line is a smart manner and is unification. Similarly, a shape equal to a part of "在" is shown in FIG. 23, but it does not intersect/contact unless extending a vertical line of the right side and a horizontal line respectively. Two strokes being at right angle is shown in FIG. 24 shown as a reference, and a human imagines a point of corner of imaginary corner from this. Here, a point intersecting actually as shown in this FIG. 24 is called a real intersection.

Imaginary intersection may be considered in the examples of FIG. 22 and FIG. 23, these are called a general intersection, here. In the general intersections, an intersection that is not on an actual line as shown in FIG. 23 is called an imaginary intersection, and in a case in which it is on an actual line of one stroke as shown in FIG. 22, it is called a quasi-imaginary intersection. Next, a specific method by which these general intersections are determined is described.

It is explained with reference to FIG. 22. Quasi-imaginary intersection of line segment 1-2 and line segment 3-4 is determined. There, positional vectors of point 1, point 2 make P1, P2, and positional vectors of point 3, point 4 make P3, P4. Placing line segment P1, P2 and line segment P3, P4 and parameters λ, λ' that take 0 to 1 value, each is expressed as (1−λ)P1+λP2, (1−λ')P3+λ'P4. Both equations are simultaneous. More specifically, (1−λ)P1+λP2=(1−λ')P3+λ'P4.

If parameters λ, λ' that take 0 to 1 value are obtained, intersection would be obtained. In order to solve this actually, for example, P1 is expressed as $(x1, y1)^T$ ($(x1, y1)^T$ is transformation of (x1, y1)) and if equation is placed every X axis, Y axis, simultaneous equation, where λ, λ' are unknown values, is placed, and λ, λ' are able to be determined.

Specifically, $$-\lambda(x1-x2)+\lambda'(x3-x4)=x3-x1,$$

$$-\lambda(y1-y2)+\lambda'(y3-y4)=y3-y1.$$

If P1 is $(x1, y1)^T$ and P2 is $(x2, y2)^T$ of line segment 1-2, specifically,
$(x1-x2)^T=(0, 4)^T$, $(x2, y2)^T=(4, 4)^T$, P3 is $(x3, y3)^T=(2, 3)^T$ and P4 is $(x4, y4)^T=(2, 0)^T$ of line segment 3-4.
x1=0, x2=4, x3=2, x4=2, y1=4, y2=4, y3=3, y4=0

By substituting these into the above equation, λ=0.5, λ'=−0.33 are obtained.

Here, λ' is negative. This means that both line segments are intersected at place where about 33% of line segment was extended toward the direction of 4→3 that is the direction opposite to the line segment 3-4.

For example:
"H" (an example of quasi-imaginary intersection: FIG. 22)
Positional Relationship
1-2: 0.50, −0.11
1-3: −3.26, −3.28
2-3: 1.34, 0.49

The first line shows that a stroke 1 is intersected with a stroke 2 and quasi-imaginary intersection and this point is at just middle point of the stroke 1, 0.50, and is distanced with 0.11 from a start portion. It should be noted that numerical value of length is normalized by each stroke length, here. A second line shows that a stroke 1 is approximately parallel with a stroke 3 and this intersection is an imaginary intersection and is at place far from an upper portion of character. A third line shows that a stroke 2 is intersected with a stroke 3 and quasi-imaginary intersection and this point is at 0.34 right from an end portion of the stroke 2 and also is at 0.49 approximately middle point of the stroke 3.

For example, "开" (an example of imaginary intersection: FIG. 23)
Positional Relationship
1-2: −0.19, −0.27
This shows that a stroke 1 is intersected with a stroke 2 and imaginary intersection. The stroke 1 and stroke 2 are intersected at 0.19, 0.27 distanced points respectively when extending along lines on those start points. More specifically, this is regarded as an imaginary corner point. "T" (an example of real intersection: FIG. 24)
Positional Relationship
1-2: 0.50, 0.14
A stroke 2 shows protruding for 0.14 at just middle of stroke 1 though it is common. This is shown in FIG. 27. Like this, relationship of plural strokes is obtained compactly and quantitatively by obtaining the above general intersection. Therefore, character of plural strokes mentioned before is able to be recognized easily.

Figure 25:
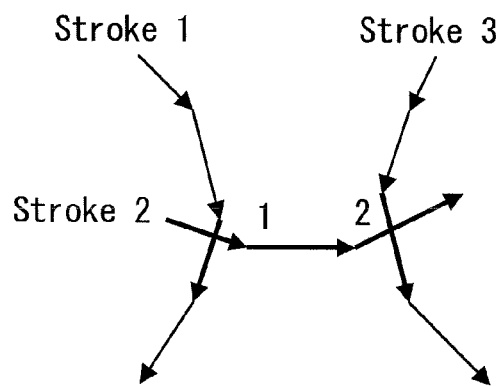
FIG. 25 is an explanatory drawing showing an example of polygonal line segments that intersect according to an embodiment of the present invention.
Figure 26:
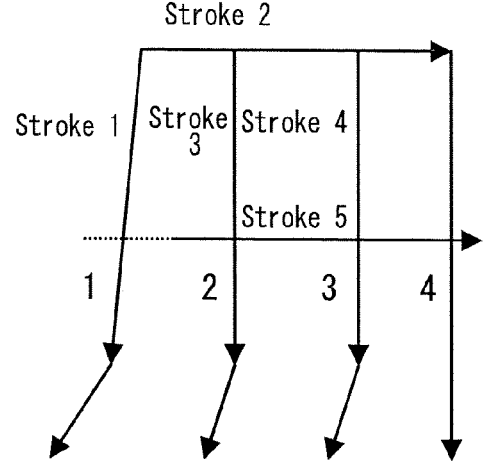
FIG. 26 is an explanatory drawing showing an example of quasi-imaginary intersection according to an embodiment of the present invention.

It should be noted that there is a case that two polygonal line segments assumed to be intersected are not selected easily, as shown in FIG. 25. In such time, if simultaneous equation is mechanically formed with a set of polygonal line segments of stroke 1 and a set of polygonal line segments of stroke 3, for example, of "H", and is solved, a pair of polygonal line segments that gives a real intersection is determined mechanically, though it becomes $7^{th}$ order in case of this figure. In case of considering more efficiency, for example, if polygonal line segments of both ends of stroke 1 are short, those may be excluded temporarily and also a polygonal line segment of end portion of stroke 3 may be excluded. As doing like this, it becomes $4^{th}$ order simultaneous equation, so it is simplified. In addition, even in case of quasi-imaginary intersection, the polygonal line segment nearest to λ value is able to be determined. A case that intersection is greatly lining up is shown in FIG. 26. Like this, relationship of stroke is also determined quantitatively and it is very effective for Chinese character whose stroke become large.

Next, a method in which a discriminating hyperplane is formed on a partial small dimensional feature space formed from each feature of each portion of winding angle on the basis of each learning data and especially discrimination between characters having similar shapes is performed, is explained.

As a specific example, there is "2"-"z" problem known as delicate problem as well as "U"-"V" problem. In this problem, actually, a sophisticated method that uses 3.sup.rd order spline function or the like is known, for example, but it is possible to solve it very easily by using the present method.

First, both of "2" and "z" are 3 as the number of winding angle, but importance is a first portion of winding angle. Therefore, both are separated almost by only the first winding angle. The following statistical measurements are obtained when seeing this with actual collected sample data.

Feature quantity→average→dispersion→standard deviation→the number of samples $\Theta(s)$: 2→209.406→1227.281→35.033→100

$\Theta(s)$: Z→126.961→74.530→8.633→111

Note: "$\Theta(s)$" is a first winding angle.
Then, the following simple distance is defined.

Figure 30:
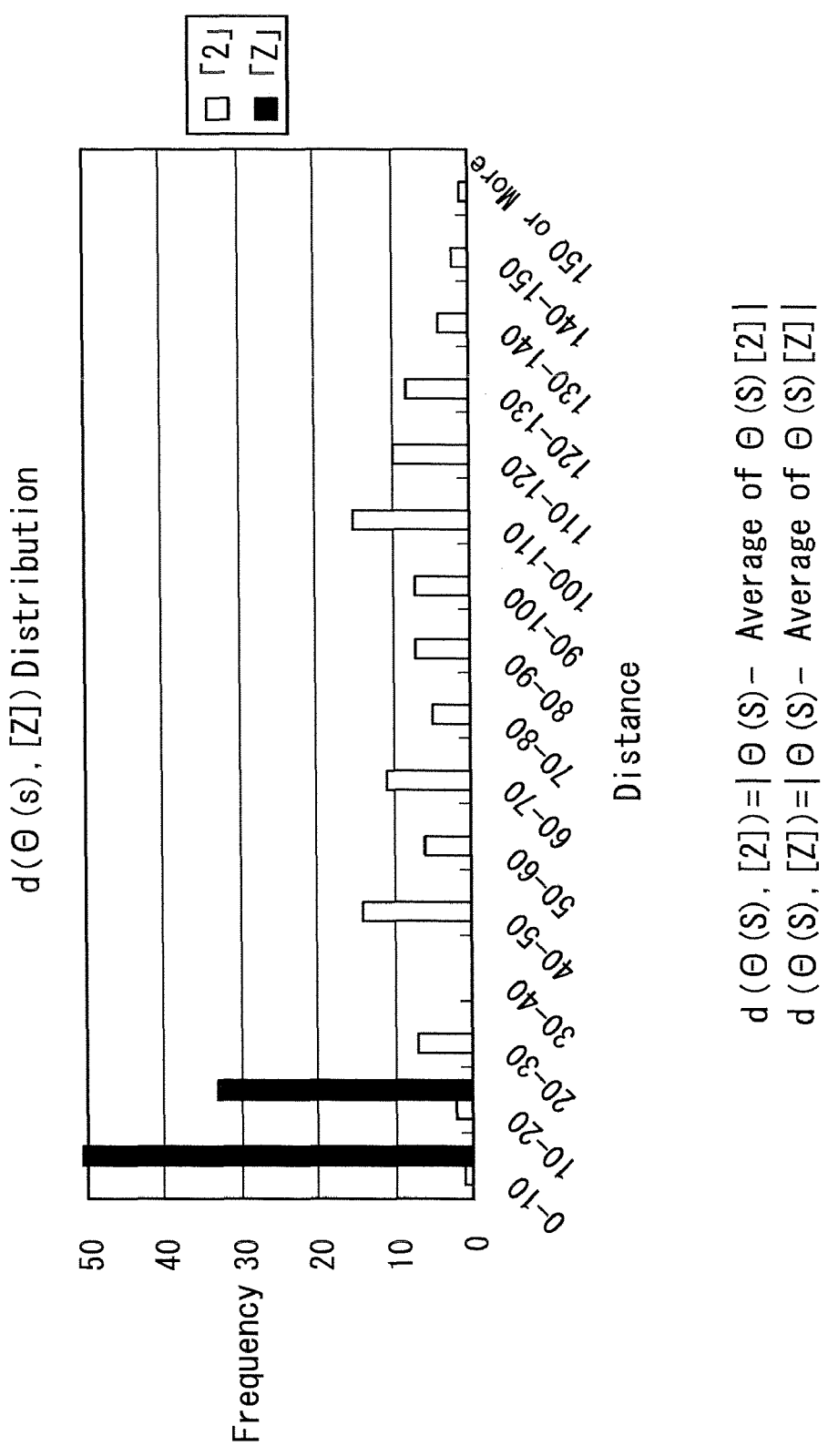
FIG. 30 is an explanatory drawing showing an example of distance and frequency according to an embodiment of the present invention.

$d(\Theta(s),[2])=|\Theta(s)-\text{average of }\Theta(s)[2]|$ $d(\Theta(s),[z])=|\Theta(s)-\text{average of }\Theta(s)[z]|$ The distribution of each data by this definition is shown in FIG. 30. All data of "z" is less than this distance at distance 20 when seeing by an axis of $d(\Theta(s), "z")$, but three pieces of data of "2" enter into "z". By seeing over all, a threshold of distance, approximately 35, seems to be suitable by seeing both distributions. However, if it is set up like this, further, seven pieces of data of "2" enter.

Then, the other feature is seen within a range of winding angle area 1. For example, average of polygonal line segment lengths that are within a range of a certain polygonal line segment angle is seen. In addition, an average line length [−60, 60] is an average length of polygonal line segments that are within angle range from −60° to 60° (sample and the number of samples are used the same as the above). Feature quantity→average→dispersion→standard deviation
Average line length [−60, 60] of "z"→0.112→0.001→0.029
Average line length [−60, −145] of "z"→0.197→0.002→0.043
Average line length [−60, 60] of "z"→0.225→0.002→0.040
Average line length [−60, −145] of "z"→0.415→0.009→0.092
Then, the following simple distance is defined.

Figure 31:
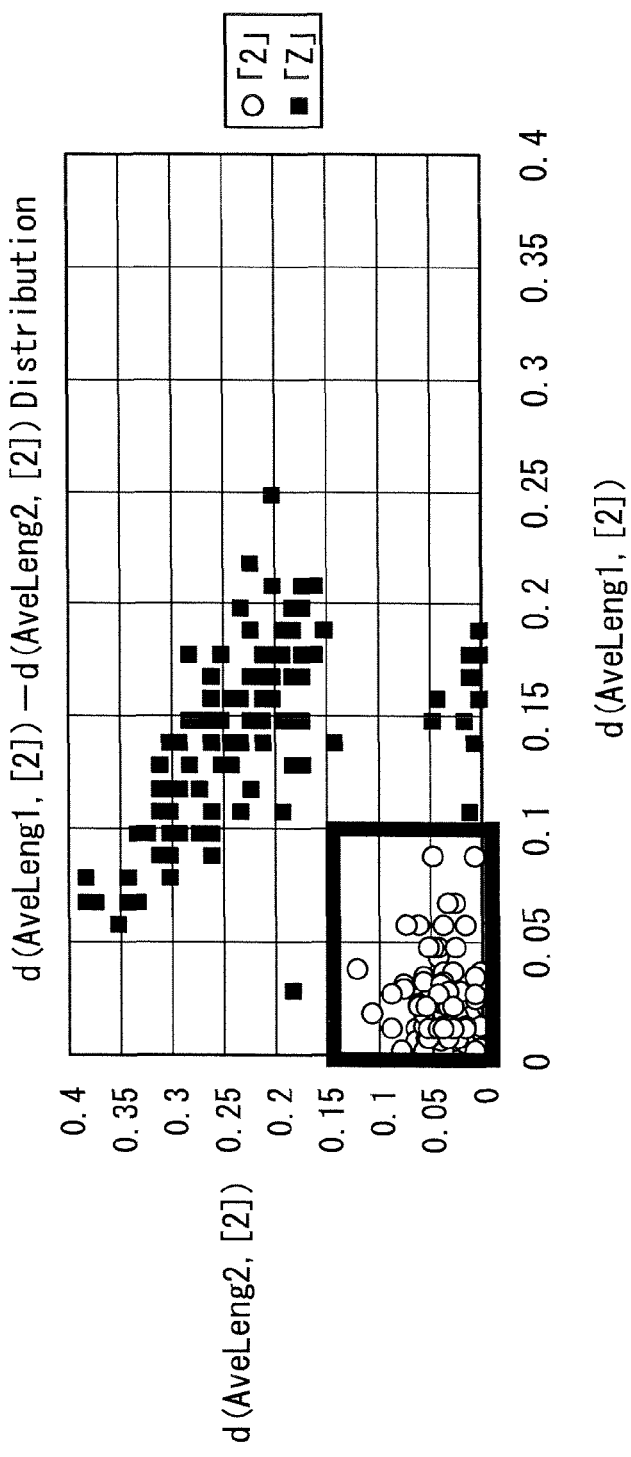
FIG. 31 is an explanatory drawing showing an example of distribution of two-dimensional distance according to an embodiment of the present invention.

$d(\text{AveLeng1},[2])=|\text{average line length}[-60,60]-[\text{average of 2}]\text{of average line length}[-60,60]|$ $d(\text{AveLeng2},[2])=|\text{average line length}[-60,-145]-[\text{average of 2}]\text{of average line length}[-60,60]|$ When seeing two-dimensional distance distribution by this definition, it is as shown in FIG. 31, all data of "2" exists in a rectangle, origin (0,0), (0.1,0) (0,0.15) (0.1,0.15), of under left (inside display of thick line) and no data of "z" exists. Furthermore, groups of "2" and "z" are distant from each other, in general.

As described above, distinction of a delicate shape is able to be done in the small dimensional feature space (two-dimension in case of 2 and z) from each learning data. Each feature constituting partial small dimension is not limited to the above average line length, and various features may be adopted according to features of comparative character or figure or the like.

Figure 32:
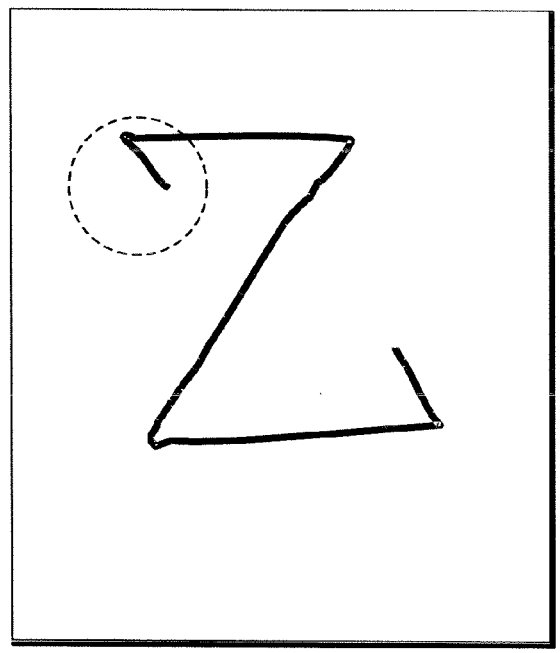
FIG. 32 is an explanatory drawing showing an example of handwritten character Z.

Here, in relating with discrimination of 2-z, problem of evaluation is explained. "z" is frequently written with a hook, as shown in FIG. 32. In such data, actually, winding angle increases rapidly and both may not be distinguished by the above scheme. However, for example, a hook of top portion may be specified as unique representation, more specifically, it may be specified as a large Δvalue of top potion and short top length. it is easy to pre-process this as noise, as mentioned before, but system that admits that there is such decoration generally is rather selected. Then, the decoration is excluded after identifying the representation and, the discrimination mentioned before is able to be implemented. This is a preferred example that the evaluation of shape and the recognition become unity really.

It is an advantage of structural analysis and also it is a strong point of this representation method.

It should be noted that the handwriting character recognition of the present invention is not limited to processing constitution shown in FIG. 1, as explained in the beginning of explanation of embodiment, and the recognition processing may be implemented by a constitution of various devices and systems if it is a constitution in which a similar handwriting character recognition is implemented substantially. For example, the handwriting character recognition of the present invention may be programmed (software) and installed into a general-purpose personal computer apparatus. A handwriting character recognition program is able to be stored and distributed.

Also, the example in FIG. 1 is an example in which a detection of handwriting is implemented at a pen side, but the detection of handwriting may be implemented at a panel side and the character recognition may be implemented on the basis of the detection.

Furthermore, in the embodiment mentioned above, it is examples as cases in which the recognition of number and alphabet is implemented mainly, but basically, handwriting character recognition of the present invention is possible to apply for character recognition of any language.

The invention claimed is:

1. A handwritten character recognition method comprising:
   capturing an input handwritten character with parameter representation for each stroke of the handwritten character and applying a polygonal approximation to each stroke;
   assuming each polygonal line segment approximated by said polygonal approximation to be a vector that reaches an end point from a start point, and obtaining an angle between an axis that becomes a reference and said each line segment as a polygonal line segment angle sequence;
   obtaining an exterior angle sequence of vertices of the obtained polygonal line segments;
   making a sum of exterior angles of a same sign to be a winding angle sequence, where the same sign is a continuous sequence of plus values or minus values in said exterior angle sequence;
   extracting a global feature according to said each obtained sequence and a localized or quasi-localized feature in each curved portion divided corresponding to said winding angle sequence, hierarchically and divisionally; and
   performing a character recognition by comparing the extracted features with a set of template features of an object character for recognition that is provided in advance.

2. The character recognition method according to claim 1, further comprising performing recognition-processing by dividing each term of the winding angle sequence into a pre-winding angle and a post winding angle before and after a loop of curve formed with said winding angle sequence.

3. The character recognition method according to claim 1, wherein said template of an object character for recognition is data in which ranges of upper and lower limits of each element of a winding angle sequence and of each feature's parameter are determined from learning data.

4. The character recognition method according to claim 1, further comprising obtaining an ends-length ratio, intermediate length, intermediate maximum length, distribution of elements of length, and distance between a start point and an end point, by using a sequence in which lengths of polygonal line segments are elements, a sequence which is normalized by the total length and a coordinate sequence in which start point, vertices and end point are elements, as said polygonal approximation representation.

5. The character recognition method according to claim 1, further comprising obtaining a weighted average angle of the polygonal line segments and exterior angle sequence, or a feature of value of boundary term, distance between a start point and an end point, start point and end point feature, or a feature of distance between boundary points, in a predetermined section.

6. The character recognition method according to claim 1, further comprising discriminating characters by constituting a discriminating hyperplane from each learning data on a partial multidimensional feature space formed with features inside of the winding angle area of each term of the winding angle sequence and among the winding angle areas.

7. The character recognition method according to claim 1, further comprising:
   taking a length sequence as one of two axes, from the exterior angle sequence of each element of the winding angle sequence and length sequence equivalent thereto;
   taking a cumulative angle of the exterior angle sequence as the other axis of the two axes and constituting a graph along the two axes by implementing a linear interpolation; and
   obtaining a global feature of curved condition by constituting a cumulative angle feature function that obtains a distance continuously as a function of distance from a start point of the element and as making the winding angle a function the starting point, or reversely as making the starting point a function of the winding angle.

8. The character recognition method according to claim 1, further comprising obtaining positional relations among two or more strokes quantitatively, by obtaining intersections between straight line groups including a representative polygonal line segment of each stroke or an extended line of a set of polygonal line segments.

9. The character recognition method according to claim 4, wherein the polygonal line segments that are shorter than a predetermined length are disregarded in said normalized sequence.

10. The character recognition method according to claim 1 or claim 7, further comprising:
    dividing an object character into two or more portions by using a pattern of change of adjacent polygonal line segment angles or a cumulative angle feature function of said polygonal line segment angle sequence inside the winding angle of each term of the winding angle sequence; and
    using features of the portions or boundary points for a comparison with an object character for recognition.

11. The character recognition method according to claim 1, further comprising:
    obtaining a point as a midpoint on a curve corresponding to a half of the winding angle of the curve including each term of said winding angle sequence;
    dividing the curve into each term before and after the midpoint;
    obtaining a subtle feature of curve extracted from each divided polygonal line segment group; and
    raising the recognition accuracy.

12. A character recognition system comprising:
    input means for inputting a handwritten character online;
    polygonal approximation means for capturing data input by said input means with parameter representation for each stroke of the handwritten character and implementing the polygonal approximation to each stroke;
    processing means for assuming said each polygonal line segment approximated by said polygonal approximation means to be vector that reaches an end point from a start point, obtaining an angle between an axis that becomes a reference and said each polygonal line segment as a polygonal line segment angle sequence, obtaining an exterior angle sequence of vertices of said polygonal line segments, and making a sum of exterior angles of a same sign to be a winding angle sequence, where the same sign is a continuous sequence of plus values or minus values in said exterior angle sequence; and
    recognition means for extracting a global feature according to each sequence obtained by said processing means and a localized or quasi-localized feature in a winding angle area of each term in the winding angle sequence hierarchically and divisionally, and performing a character recognition by comparing the extracted features with a set of template features of an object character for recognition that is provided in advance.

* * * * *